(12) United States Patent
Suzuki et al.

(10) Patent No.: US 10,710,595 B2
(45) Date of Patent: Jul. 14, 2020

(54) DRIVING EVALUATION DEVICE, DRIVING EVALUATION METHOD, AND NON-TRANSITORY READABLE RECORDING MEDIUM STORING DRIVING EVALUATION PROGRAM

(71) Applicant: TOYOTA JIDOSHA KABUSHIKI KAISHA, Toyota-shi, Aichi-ken (JP)

(72) Inventors: Ryuichi Suzuki, Nagakute (JP); Koki Fujita, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/396,958

(22) Filed: Apr. 29, 2019

(65) Prior Publication Data

US 2019/0382027 A1    Dec. 19, 2019

(30) Foreign Application Priority Data

Jun. 13, 2018 (JP) ................................. 2018-113004

(51) Int. Cl.
| | | |
|---|---|---|
| *B60W 40/09* | (2012.01) | |
| *B60K 35/00* | (2006.01) | |
| *G07C 5/08* | (2006.01) | |
| *G07C 5/00* | (2006.01) | |

(52) U.S. Cl.
CPC ............ *B60W 40/09* (2013.01); *B60K 35/00* (2013.01); *G07C 5/008* (2013.01); *G07C 5/085* (2013.01); *B60K 2370/174* (2019.05)

(58) Field of Classification Search
None
See application file for complete search history.

(56) References Cited

U.S. PATENT DOCUMENTS

| | | | | |
|---|---|---|---|---|
| 6,359,403 B1 * | 3/2002 | Pollklas | ................. | B60K 31/04 180/65.1 |
| 8,508,354 B2 * | 8/2013 | Harumoto | ............. | F02D 41/123 340/439 |
| 8,606,459 B2 * | 12/2013 | Sekiyama | ............. | B60W 40/09 701/32.8 |
| 8,744,768 B2 * | 6/2014 | Gutierez-Castaneda | .................... | G05D 1/0005 701/528 |
| 8,825,320 B2 * | 9/2014 | Heap | ..................... | B60W 10/06 701/55 |
| 8,972,160 B2 * | 3/2015 | Miura | ................ | G01C 21/3697 701/104 |
| 9,050,935 B2 * | 6/2015 | Stefan | ............. | B60W 30/18072 |
| 9,211,891 B2 * | 12/2015 | Scofield | ............... | G08G 1/0112 |
| 9,242,653 B2 * | 1/2016 | Schweikl | ............... | B60K 37/02 |

(Continued)

FOREIGN PATENT DOCUMENTS

| | | |
|---|---|---|
| JP | 2010-038652 A | 2/2010 |
| JP | 2010-066786 A | 3/2010 |
| JP | 2010-272069 A | 12/2010 |

*Primary Examiner* — Chico A Foxx
(74) *Attorney, Agent, or Firm* — Oliff PLC

(57) ABSTRACT

A driving evaluation device includes a processor. The processor is configured to acquire vehicle information including a vehicle speed in each trip of a vehicle, evaluate an economical level of each trip of the vehicle based on smallness of change in vehicle speed, and change an evaluation method of the economical level based on the smallness of the change in vehicle speed according to the maximum speed in each trip.

7 Claims, 11 Drawing Sheets

(56) References Cited

U.S. PATENT DOCUMENTS

| | | | | |
|---|---|---|---|---|
| 9,256,995 B2* | 2/2016 | Kawai | | G07C 5/0808 |
| 9,519,875 B2* | 12/2016 | Lamprecht | | G06Q 10/04 |
| 10,393,562 B2* | 8/2019 | Peters | | F02D 19/028 |
| 10,487,715 B2* | 11/2019 | De Smet | | F01N 11/00 |
| 2007/0239322 A1* | 10/2007 | McQuade | | G07C 5/008 |
| | | | | 701/1 |
| 2007/0256481 A1* | 11/2007 | Nishiyama | | G01F 9/02 |
| | | | | 73/114.52 |
| 2009/0024419 A1* | 1/2009 | McClellan | | G06Q 40/02 |
| | | | | 705/4 |
| 2009/0118949 A1* | 5/2009 | Heap | | B60W 10/06 |
| | | | | 701/55 |
| 2010/0026476 A1 | 2/2010 | Yamaoka et al. | | |
| 2010/0030420 A1* | 2/2010 | Tauchi | | B60W 50/0098 |
| | | | | 701/31.4 |
| 2010/0087984 A1* | 4/2010 | Joseph | | G09B 9/052 |
| | | | | 701/31.4 |
| 2010/0305814 A1* | 12/2010 | Ichikawa | | G07C 5/085 |
| | | | | 701/33.4 |
| 2011/0140874 A1* | 6/2011 | Tauchi | | G01C 21/26 |
| | | | | 340/438 |
| 2011/0169624 A1* | 7/2011 | Anschutz | | B60K 28/066 |
| | | | | 340/439 |
| 2011/0172877 A1* | 7/2011 | Dourra | | F16H 59/52 |
| | | | | 701/33.4 |
| 2012/0035821 A1* | 2/2012 | Hannemann | | B60W 40/12 |
| | | | | 701/70 |
| 2013/0054281 A1* | 2/2013 | Thakkar | | G06Q 30/0207 |
| | | | | 705/5 |
| 2013/0073112 A1* | 3/2013 | Phelan | | G06Q 40/00 |
| | | | | 701/1 |
| 2014/0100738 A1* | 4/2014 | Itatsu | | G07C 5/0808 |
| | | | | 701/33.4 |
| 2014/0188379 A1* | 7/2014 | Gostoli | | G07C 5/085 |
| | | | | 701/123 |
| 2014/0272810 A1* | 9/2014 | Fields | | G01C 21/3676 |
| | | | | 434/65 |
| 2014/0350777 A1* | 11/2014 | Kawai | | G07C 5/0808 |
| | | | | 701/32.3 |
| 2014/0350970 A1* | 11/2014 | Schumann, Jr. | | |
| | | | | G08G 1/096775 |
| | | | | 705/4 |
| 2015/0239454 A1* | 8/2015 | Sujan | | B60W 30/182 |
| | | | | 701/54 |
| 2015/0329102 A1* | 11/2015 | Yoshikawa | | B60W 30/182 |
| | | | | 701/22 |
| 2016/0086397 A1* | 3/2016 | Phillips | | G07C 5/0808 |
| | | | | 701/32.4 |
| 2017/0032673 A1* | 2/2017 | Scofield | | A61B 5/4845 |
| 2017/0043776 A1* | 2/2017 | Sujan | | B60W 30/188 |
| 2017/0076395 A1* | 3/2017 | Sedlik | | G08G 1/096822 |
| 2017/0102708 A1* | 4/2017 | Bando | | B60W 40/09 |
| 2017/0132951 A1* | 5/2017 | Fields | | B60W 40/09 |
| 2017/0206717 A1* | 7/2017 | Kuhnapfel | | H04L 67/22 |
| 2017/0309089 A1* | 10/2017 | Shimada | | G06F 16/2228 |
| 2017/0316686 A1* | 11/2017 | Verheijen | | B60W 30/18136 |
| 2017/0372431 A1* | 12/2017 | Perl | | G07C 5/085 |
| 2018/0300816 A1* | 10/2018 | Perl | | G06Q 40/08 |
| 2018/0306629 A1* | 10/2018 | Kobayashi | | B60K 35/00 |
| 2019/0152489 A1* | 5/2019 | Innes | | B60W 40/09 |
| 2019/0287180 A1* | 9/2019 | Vartanian | | G07C 5/008 |
| 2019/0367037 A1* | 12/2019 | Krishnamurthy | | G01C 21/3484 |

* cited by examiner

FIG. 5

| MAJOR ITEM | | LOW-SPEED TRIP LOWER THAN MAXIMUM SPEED 70 km/h | |
| --- | --- | --- | --- |
| | | 0 km/h TO 40 km/h | 30 km/h TO 70 km/h |
| CALMNESS OF ACCELERATOR OPERATION | OUTLINE | WHEN TIME FROM START AT 0 km/h UNTIL 40 km/h IS LONGER, HIGHER EVALUATION | WHEN PROPORTION OF ACCELERATOR OPERATION AMOUNT OF 0% TO 30% IN SPEED RANGE OF 30 km/h TO 70 km/h IS HIGHER, HIGHER EVALUATION |
| | EVALUATION CRITERION | AVERAGE<br>19 SECONDS OR MORE ★★★★★<br>18 TO 18.9 SECONDS ★★★★☆<br>17 TO 17.9 SECONDS ★★★☆☆<br>16 TO 16.9 SECONDS ★★☆☆☆<br>LESS THAN 16 SECONDS ★☆☆☆☆ | AVERAGE<br>98% OR MORE ★★★★★<br>96 TO 97.9% ★★★★☆<br>93 TO 95.9% ★★★☆☆<br>87.1 TO 92.9% ★★☆☆☆<br>87% OR LESS ★☆☆☆☆ |
| CALMNESS OF BRAKE OPERATION | OUTLINE | WHEN AVERAGE FREQUENCY OF BRAKE PER 10 km TRAVELING IS SMALLER AND FORWARD ACCELERATION IS SMALLER, HIGHER EVALUATION | |
| | EVALUATION CRITERION | SEE FIGS. 8A AND 8B | |
| SMALLNESS OF CHANGE IN SPEED (CONSTANT-SPEED TRAVELING) | OUTLINE | WHEN VEHICLE SPEED IS EQUAL TO OR HIGHER THAN 20 km/h AND AVERAGE PROPORTION OF TRAVELING WITH LONGITUDINAL G EQUAL TO OR LESS THAN 0.1 G IS HIGHER, HIGHER EVALUATION | |
| | EVALUATION CRITERION | AVERAGE<br>90% OR MORE ★★★★★<br>85 TO 89% ★★★★☆<br>80 TO 84% ★★★☆☆<br>75 TO 79% ★★☆☆☆<br>74% OR LESS ★☆☆☆☆ | |
| SHORTNESS OF IDLING TIME | OUTLINE | WHEN IDLING TIME IS SHORTER, HIGHER EVALUATION | |
| | EVALUATION CRITERION | AVERAGE<br>WITHIN 30% ★★★★★<br>31 TO 35% ★★★★☆<br>36 TO 40% ★★★☆☆<br>41 TO 45% ★★☆☆☆<br>46% OR MORE ★☆☆☆☆ | |

FIG. 6

| MAJOR ITEM | | HIGH-SPEED TRIP INCLUDING MAXIMUM SPEED 70 km/h OR MORE | |
|---|---|---|---|
| | | 0 km/h TO 40 km/h | 30 km/h OR MORE |
| CALMNESS OF ACCELERATOR OPERATION | OUTLINE | WHEN TIME FROM START AT 0 km/h UNTIL 40 km/h IS LONGER, HIGHER EVALUATION | WHEN PROPORTION OF ACCELERATOR OPERATION AMOUNT OF 0% TO 40% AT VEHICLE SPEED OF 30 km/h OR MORE IS GREATER, HIGHER EVALUATION |
| | EVALUATION CRITERION | AVERAGE<br>19 SECONDS OR MORE ★★★★★<br>18 TO 18.9 SECONDS ★★★★☆<br>17 TO 17.9 SECONDS ★★★☆☆<br>16 TO 16.9 SECONDS ★★☆☆☆<br>LESS THAN 16 SECONDS ★☆☆☆☆ | AVERAGE<br>99% OR MORE ★★★★★<br>98 TO 98.9% ★★★★☆<br>96.5 TO 97.9% ★★★☆☆<br>93.1 TO 96.4% ★★☆☆☆<br>93% OR LESS ★☆☆☆☆ |
| CALMNESS OF BRAKE OPERATION | OUTLINE | WHEN AVERAGE FREQUENCY OF BRAKE PER 10 km TRAVELING IS SMALLER AND FORWARD ACCELERATION IS SMALLER, HIGHER EVALUATION | |
| | EVALUATION CRITERION | SEE FIGS. 8A AND 8B | |
| SMALLNESS OF CHANGE IN SPEED (CONSTANT-SPEED TRAVELING) | OUTLINE | WHEN VEHICLE SPEED IS EQUAL TO OR HIGHER THAN 20 km/h AND AVERAGE PROPORTION OF TRAVELING WITH LONGITUDINAL G EQUAL TO OR LESS THAN 0.1 G IS HIGHER, HIGHER EVALUATION | |
| | EVALUATION CRITERION | AVERAGE<br>95% OR MORE ★★★★★<br>90 TO 94% ★★★★☆<br>80 TO 89% ★★★☆☆<br>70 TO 79% ★★☆☆☆<br>69% OR LESS ★☆☆☆☆ | |
| SHORTNESS OF IDLING TIME | OUTLINE | WHEN IDLING TIME IS SHORTER, HIGHER EVALUATION | |
| | EVALUATION CRITERION | AVERAGE<br>WITHIN 30% ★★★★★<br>31 TO 35% ★★★★☆<br>36 TO 40% ★★★☆☆<br>41 TO 45% ★★☆☆☆<br>46% OR MORE ★☆☆☆☆ | |

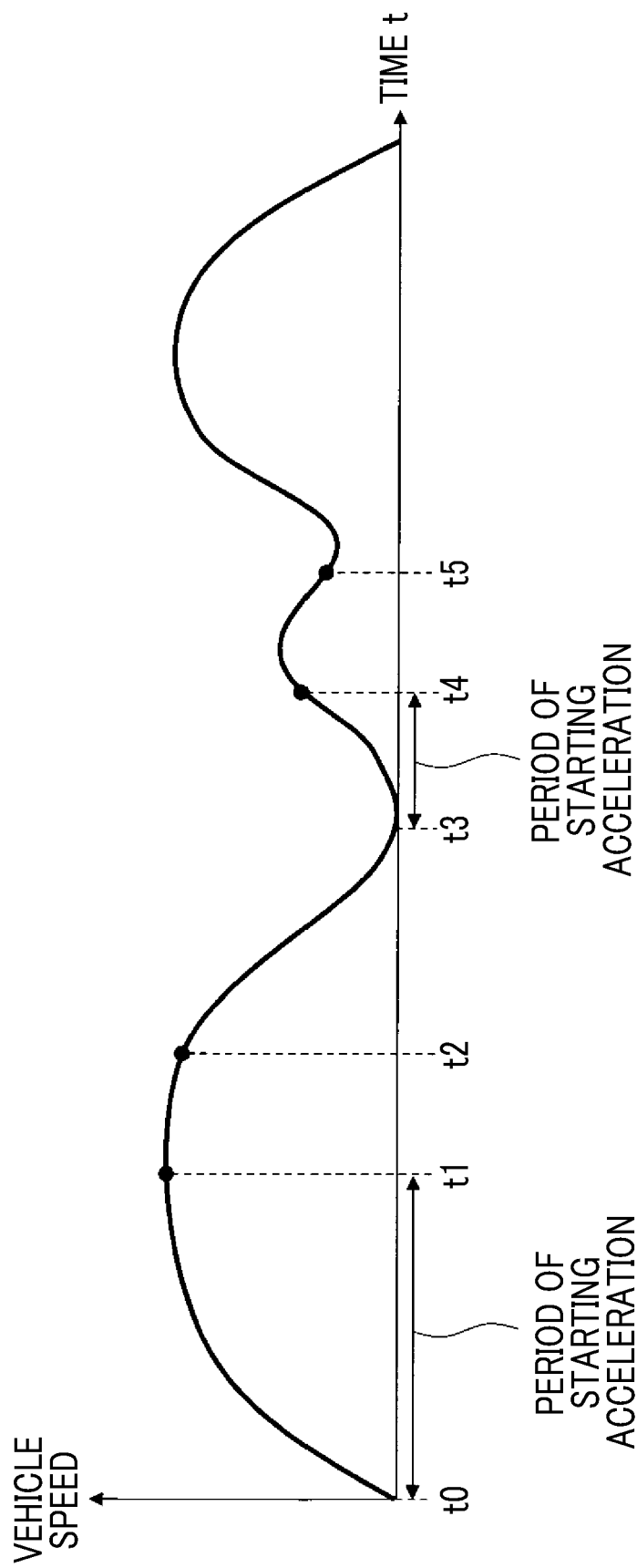

FIG. 8A

| # | ★★★★★ | ★★★★☆ | ★★★☆☆ | ★★☆☆☆ | ★☆☆☆☆ |
|---|---|---|---|---|---|
| (1) | 0.3 G OR MORE / 0.25 TO 0.3 G / 0.2 TO 0.25 G | 0 TIMES / 0 TIMES / 1 TIME | 0.3 G OR MORE / 0.25 TO 0.3 G / 0.2 TO 0.25 G | 0 TIMES / 0 TIMES / 7 TIMES | 0.3 G OR MORE / 0.25 TO 0.3 G / 0.2 TO 0.25 G | 0 TIMES / 0 TIMES / 9 TIMES | 0.3 G OR MORE / 0.25 TO 0.3 G / 0.2 TO 0.25 G | 0 TIMES / 0 TIMES / 10 TIMES | 0.3 G OR MORE / 0.25 TO 0.3 G / 0.2 TO 0.25 G | 0 TIMES / 0 TO 5 TIMES / 11 OR MORE TIMES |
| (2) | 0.3 G OR MORE / 0.25 TO 0.3 G / 0.2 TO 0.25 G | 0 TIMES / 0 TIMES / 2 TIMES | 0.3 G OR MORE / 0.25 TO 0.3 G / 0.2 TO 0.25 G | 0 TIMES / 0 TIMES / 8 TIMES | 0.3 G OR MORE / 0.25 TO 0.3 G / 0.2 TO 0.25 G | 0 TIMES / 1 TIME / 9 TIMES | 0.3 G OR MORE / 0.25 TO 0.3 G / 0.2 TO 0.25 G | 0 TIMES / 1 TIME / 10 TIMES | 0.3 G OR MORE / 0.25 TO 0.3 G / 0.2 TO 0.25 G | 1 TIME / 0 TO 5 TIMES / 11 OR MORE TIMES |
| (3) | 0.3 G OR MORE / 0.25 TO 0.3 G / 0.2 TO 0.25 G | 0 TIMES / 0 TIMES / 3 TIMES | 0.3 G OR MORE / 0.25 TO 0.3 G / 0.2 TO 0.25 G | 0 TIMES / 1 TIME / 7 TIMES | 0.3 G OR MORE / 0.25 TO 0.3 G / 0.2 TO 0.25 G | 0 TIMES / 2 TIMES / 9 TIMES | 0.3 G OR MORE / 0.25 TO 0.3 G / 0.2 TO 0.25 G | 0 TIMES / 2 TIMES / 10 TIMES | 0.3 G OR MORE / 0.25 TO 0.3 G / 0.2 TO 0.25 G | 2 TIMES / 0 TO 5 TIMES / 11 OR MORE TIMES |
| (4) | 0.3 G OR MORE / 0.25 TO 0.3 G / 0.2 TO 0.25 G | 0 TIMES / 0 TIMES / 4 TIMES | 0.3 G OR MORE / 0.25 TO 0.3 G / 0.2 TO 0.25 G | 0 TIMES / 1 TIME / 8 TIMES | 0.3 G OR MORE / 0.25 TO 0.3 G / 0.2 TO 0.25 G | 0 TIMES / 3 TIMES / 9 TIMES | 0.3 G OR MORE / 0.25 TO 0.3 G / 0.2 TO 0.25 G | 0 TIMES / 3 TIMES / 10 TIMES | 0.3 G OR MORE / 0.25 TO 0.3 G / 0.2 TO 0.25 G | 3 TIMES / 0 TO 5 TIMES / 11 OR MORE TIMES |
| (5) | 0.3 G OR MORE / 0.25 TO 0.3 G / 0.2 TO 0.25 G | 0 TIMES / 0 TIMES / 5 TIMES | 0.3 G OR MORE / 0.25 TO 0.3 G / 0.2 TO 0.25 G | 0 TIMES / 2 TIMES / 7 TIMES | 0.3 G OR MORE / 0.25 TO 0.3 G / 0.2 TO 0.25 G | 1 TIME / 0 TO 9 TIMES | 0.3 G OR MORE / 0.25 TO 0.3 G / 0.2 TO 0.25 G | 0 TIMES / 4 TIMES / 10 TIMES | 0.3 G OR MORE / 0.25 TO 0.3 G / 0.2 TO 0.25 G | 0 TIMES / 5 OR MORE TIMES / — |
| (6) | 0.3 G OR MORE / 0.25 TO 0.3 G / 0.2 TO 0.25 G | 0 TIMES / 0 TIMES / 6 TIMES | 0.3 G OR MORE / 0.25 TO 0.3 G / 0.2 TO 0.25 G | 0 TIMES / 2 TIMES / 8 TIMES | 0.3 G OR MORE / 0.25 TO 0.3 G / 0.2 TO 0.25 G | 1 TIME / 1 TIME / 0 TO 9 TIMES | 0.3 G OR MORE / 0.25 TO 0.3 G / 0.2 TO 0.25 G | 1 TIME / 0 TIMES / 0 TO 10 TIMES | 0.3 G OR MORE / 0.25 TO 0.3 G / 0.2 TO 0.25 G | 1 TIME / 5 OR MORE TIMES / — |
| (7) | 0.3 G OR MORE / 0.25 TO 0.3 G / 0.2 TO 0.25 G | 0 TIMES / 1 TIME / 1 TIME | | | 0.3 G OR MORE / 0.25 TO 0.3 G / 0.2 TO 0.25 G | 1 TIME / 2 TIMES / 0 TO 9 TIMES | 0.3 G OR MORE / 0.25 TO 0.3 G / 0.2 TO 0.25 G | 1 TIME / 1 TIME / 10 TIMES | 0.3 G OR MORE / 0.25 TO 0.3 G / 0.2 TO 0.25 G | 2 TIMES / 5 OR MORE TIMES / — |

FIG. 8B

| # | ★★★★★ | ★★★★☆ | ★★★☆☆ | ★★☆☆☆ | ★☆☆☆☆ |
|---|---|---|---|---|---|
| (8) | 0.3 G OR MORE: 0 TIMES<br>0.25 TO 0.3 G: 1 TIME<br>0.2 TO 0.25 G: 2 TIMES | | 0.3 G OR MORE: 1 TIME<br>0.25 TO 0.3 G: 3 TIMES<br>0.2 TO 0.25 G: 0 TO 9 TIMES | 0.3 G OR MORE<br>0.25 TO 0.3 G<br>0.2 TO 0.25 G | 0.3 G OR MORE: 3 OR MORE TIMES<br>0.25 TO 0.3 G: -<br>0.2 TO 0.25 G: - |
| (9) | 0.3 G OR MORE: 0 TIMES<br>0.25 TO 0.3 G: 1 TIME<br>0.2 TO 0.25 G: 3 TIMES | | 0.3 G OR MORE: 1 TIME<br>0.25 TO 0.3 G: 2 TIMES<br>0.2 TO 0.25 G: 10 TIMES | | |
| (10) | 0.3 G OR MORE: 0 TIMES<br>0.25 TO 0.3 G: 1 TIME<br>0.2 TO 0.25 G: 4 TIMES | | 0.3 G OR MORE: 1 TIME<br>0.25 TO 0.3 G: 3 TIMES<br>0.2 TO 0.25 G: 10 TIMES | | |
| (11) | 0.3 G OR MORE: 0 TIMES<br>0.25 TO 0.3 G: 1 TIME<br>0.2 TO 0.25 G: 5 TIMES | | 0.3 G OR MORE: 2 TIMES<br>0.25 TO 0.3 G: 0 TIMES<br>0.2 TO 0.25 G: 0 TO 10 TIMES | | |
| (12) | 0.3 G OR MORE: 0 TIMES<br>0.25 TO 0.3 G: 1 TIME<br>0.2 TO 0.25 G: 6 TIMES | | 0.3 G OR MORE: 2 TIMES<br>0.25 TO 0.3 G: 1 TIME<br>0.2 TO 0.25 G: 0 TO 10 TIMES | | |
| (13) | | | 0.3 G OR MORE: 2 TIMES<br>0.25 TO 0.3 G: 2 TIMES<br>0.2 TO 0.25 G: 0 TO 10 TIMES | | |
| (14) | | | 0.3 G OR MORE: 2 TIMES<br>0.25 TO 0.3 G: 3 TIMES<br>0.2 TO 0.25 G: 0 TO 10 TIMES | | |

FIG. 9

| ITEM | EVALUATION OF LOW-SPEED GROUP LESS THAN 70 km/h | | | | EVALUATION OF HIGH-SPEED GROUP EQUAL TO OR HIGHER THAN 70 km/h | | | |
|---|---|---|---|---|---|---|---|---|
| | CALMNESS OF ACCELERATOR OPERATION | | CALMNESS OF BRAKE OPERATION | SMALLNESS OF CHANGE IN SPEED | SHORTNESS OF IDLING TIME | CALMNESS OF ACCELERATOR OPERATION | | CALMNESS OF BRAKE OPERATION | SMALLNESS OF CHANGE IN SPEED | SHORTNESS OF IDLING TIME |
| | STARTING | DURING TRAVELING | | | | STARTING | DURING TRAVELING | | | |
| EVALUATION POINT | ★★★ | ★★★ → ★★★ | ★★ | ★★★ | ★★ | ★★★★ | ★★★ → ★★★★ | ★★★★★ | ★★★ | ★★★★ |
| SCORE COEFFICIENT | 20% | | 20% | 25% | 35% | 20% | | 15% | 45% | 20% |
| | 49 POINTS | | | | 67 POINTS | | | |

TOTAL EVALUATION 30:70

| DISTANCE RATIO | CALMNESS OF ACCELERATOR OPERATION | CALMNESS OF BRAKE OPERATION | SMALLNESS OF CHANGE IN SPEED | SHORTNESS OF IDLING TIME |
|---|---|---|---|---|
| TOTAL EVALUATION POINT | ★★★ | ★★★ | ★★★ | ★★★ |
| TOTAL SCORE | 62 POINTS | | | |

DRIVING EVALUATION DEVICE, DRIVING EVALUATION METHOD, AND NON-TRANSITORY READABLE RECORDING MEDIUM STORING DRIVING EVALUATION PROGRAM

INCORPORATION BY REFERENCE

The disclosure of Japanese Patent Application No. 2018-113004 filed on Jun. 13, 2018 including the specification, drawings and abstract is incorporated herein by reference in its entirety.

BACKGROUND

1. Technical Field

The present disclosure relates to a driving evaluation device, a driving evaluation method, and a non-transitory readable recording medium storing a driving evaluation program.

2. Description of Related Art

In the related art, a driving advice providing device that diagnoses a driving state of a driver based on a vehicle state, such as a speed or an acceleration, and provides advice based on a diagnosis result is known. A plurality of diagnosis items is used for diagnosis, diagnosis is performed by a diagnosis method according to each diagnosis item, and advice is generated. When a plurality of advice is generated, advice with high priority is preferentially provided (for example, see Japanese Unexamined Patent Application Publication No. 2010-038652 (JP 2010-038652 A)).

SUMMARY

On the other hand, the driving advice providing device of the related art performs diagnosis using the same diagnosis method even though speed ranges of a vehicle are different. When the speed ranges of the vehicle are different, there is a case where more appropriate diagnosis is performed by changing a determination criterion in diagnosis. That is, it is possible to perform diagnosis (evaluation) with higher accuracy taking the difference between the speed ranges of the vehicle into consideration.

Accordingly, the present disclosure provides a driving evaluation device, a driving evaluation method, and a non-transitory readable recording medium storing a driving evaluation program capable of performing evaluation with higher accuracy.

A first aspect of the present disclosure relates to a driving evaluation device. The driving evaluation device includes a processor. The processor is configured to acquire vehicle information including a vehicle speed in each trip of a vehicle, evaluate an economical level of each trip of the vehicle based on smallness of change in vehicle speed, and change an evaluation method of the economical level based on the smallness of the change in vehicle speed according to the maximum speed in each trip.

For this reason, the evaluation method of the economical level depending on the smallness of the change in vehicle speed differs according to the maximum speed of the trip.

According to the first aspect of the present disclosure, it is possible to provide a driving evaluation device capable of performing evaluation with higher accuracy based on the smallness of the change in vehicle speed.

In the driving evaluation device according to the first aspect, the processor is configured to calculate, as the economical level, a total evaluation result obtained by totaling an evaluation result for a trip where the maximum speed is equal to or higher than a predetermined speed and an evaluation result for a trip where the maximum speed is lower than the predetermined speed according to a ratio of a distance of the trip where the maximum speed is equal to or higher than the predetermined speed to a distance of the trip where the maximum speed is lower than the predetermined speed.

For this reason, the total evaluation result is a result obtained by totaling the evaluation result for a trip where a speed range is high and the evaluation result for a trip where a speed range is low according to the ratio of the distances of both trips.

According to the aspect, it is possible to provide a driving evaluation device capable of performing evaluation with higher accuracy taking into consideration evaluation results for the trip where the speed range is high and the trip where the speed range is low.

In the driving evaluation device according to the first aspect, the processor may be configured to, in evaluating the economical level based on the smallness of the change in vehicle speed, evaluate the economical level according to the smallness of the change in vehicle speed to be higher when the maximum speed is equal to or higher than a predetermined speed than when the maximum speed is lower than the predetermined speed.

For this reason, in the trip where the speed range is high rather than the trip where the speed range is low, when the change in vehicle speed is smaller, a degree of contribution of the smallness of the change in vehicle speed to the economical level is higher than a degree of contribution of an evaluation item other than the change in vehicle speed.

According to the aspect, when the change in vehicle speed in the trip where the speed range is high is smaller, the degree of contribution of the smallness of change in vehicle speed to the economical level is evaluated to be higher, whereby it is possible to provide a driving evaluation device capable of performing evaluation with higher accuracy.

In the driving evaluation device according to the first aspect, the processor may be configured to, in evaluating the economical level based on the smallness of the change in vehicle speed and an evaluation item other than the smallness of the change in vehicle speed, set a degree of contribution of the smallness of the change in vehicle speed to the economical level to be higher when the maximum speed is equal to or higher than a predetermined speed than when the maximum speed is lower than the predetermined speed.

For this reason, in the trip where the speed range is high rather than the trip where the speed range is low, when the change in vehicle speed is small, the economical level is evaluated to be higher.

According to the aspect, when the change in vehicle speed in the trip where the speed range is high is small, the economical level is evaluated to be higher, whereby it is possible to provide a driving evaluation device capable of performing evaluation with higher accuracy.

In the driving evaluation device according to the first aspect, the predetermined speed is 70 kilometers per hour.

For this reason, 70 km/h that is a value between a speed limit on an expressway and a speed limit on a general road is set as the maximum speed in the trip for distinguishing between the trip where the speed range is high and the trip where the speed range is low, whereby it is possible to change the evaluation of the economical levels of the trip where the speed range is high and the trip where the speed range is low.

According to the aspect, with 70 kilometers per hour as a determination criterion, it is possible to provide a driving evaluation device capable of performing evaluation with higher accuracy.

In the driving evaluation device according to the first aspect, the vehicle information may include a longitudinal acceleration of the vehicle. The processor may be configured to determine the smallness of the change in vehicle speed based on the longitudinal acceleration of the vehicle.

For this reason, the evaluation method of the economical level depending on smallness of the longitudinal acceleration differs according to the maximum speed of the trip.

According to the aspect, it is possible to provide a driving evaluation device capable of performing evaluation with higher accuracy based on the smallness of the longitudinal acceleration of the vehicle.

A second aspect of the present disclosure relates to a driving evaluation method using a driving evaluation device configured to evaluate an economical level of each trip of a vehicle. The driving evaluation device includes a processor. The driving evaluation method causes the processor to execute acquiring vehicle information including a vehicle speed in each trip of the vehicle, evaluating the economical level of each trip of the vehicle based on smallness of change in vehicle speed, and changing an evaluation method of the economical level based on the smallness of the change in vehicle speed according to the maximum speed in each trip.

For this reason, the evaluation method of the economical level depending on the smallness of the change in vehicle speed differs according to the maximum speed of the trip.

According to the second aspect of the present disclosure, it is possible to provide a driving evaluation method capable of performing evaluation with higher accuracy based on the smallness of the change in vehicle speed.

A third aspect of the present disclosure relates to a non-transitory readable recording medium storing a program for causing a processor to execute a driving evaluation method using a driving evaluation device configured to evaluate an economical level of each trip of a vehicle. The program causes the processor to execute a control process of the driving evaluation device. The control process includes acquiring vehicle information including a vehicle speed in each trip of the vehicle, evaluating the economical level of each trip of the vehicle based on smallness of change in vehicle speed, and changing an evaluation method of the economical level based on the smallness of the change in vehicle speed according to the maximum speed in each trip.

For this reason, the evaluation method of the economical level depending on the smallness of the change in vehicle speed differs according to the maximum speed of the trip.

According to the third aspect of the present disclosure, it is possible to provide a non-transitory readable recording medium storing a driving evaluation program capable of performing evaluation with higher accuracy based on the smallness of the change in vehicle speed.

According to the aspects of the present disclosure, it is possible to provide a driving evaluation device, a driving evaluation method, and a non-transitory readable recording medium storing a driving evaluation program capable of performing evaluation with higher accuracy.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 5 is a table showing details of four evaluation items for a low-speed group including a trip where the maximum speed is lower than 70 km/h;

FIG. 6 is a table showing details of four evaluation items for a high-speed group including a trip where the maximum speed is equal to or higher than 70 km/h;

FIG. 7 is a graph illustrating starting acceleration;

FIGS. 8A and 8B is a table showing data that is used to give an evaluation point for calmness of a brake operation;

FIG. 9 is a table illustrating ways of obtaining scores of the low-speed group and the high-speed group, and a way of obtaining a total evaluation result;

DETAILED DESCRIPTION OF EMBODIMENTS

Hereinafter, an embodiment to which a driving evaluation device, a driving evaluation method, and a non-transitory readable recording medium storing a driving evaluation program of the present disclosure are applied will be described.

Embodiment

Figure 1:
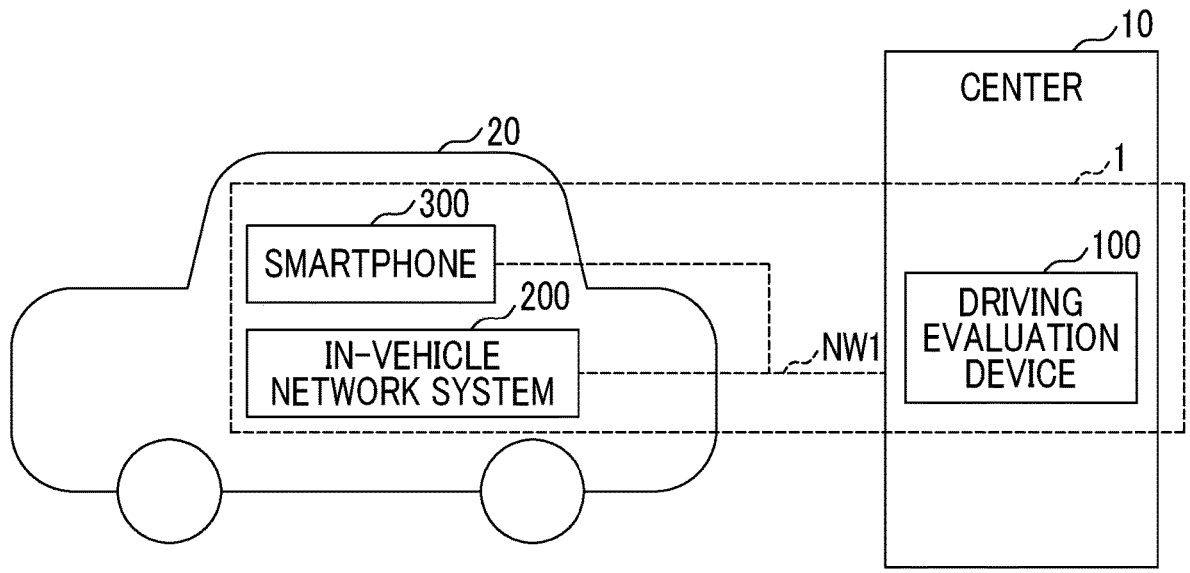
FIG. 1 is a diagram showing an example of the configuration of a driving evaluation system including a driving evaluation device of an embodiment.

FIG. 1 is a diagram showing an example of the configuration of a driving evaluation system 1 including a driving evaluation device 100 of the embodiment.

The driving evaluation system 1 includes the driving evaluation device 100 of a center 10, an in-vehicle network system 200 mounted in a vehicle 20, and a smartphone 300 carried with a user of the vehicle 20. The center 10 holds data in which an identifier of the in-vehicle network system 200 mounted in the vehicle 20 is associated with an identifier of the smartphone 300 carried with the user of the vehicle 20. That is, with data held in the center 10, the in-vehicle network system 200 mounted in the vehicle 20 corresponds to the smartphone 300 carried with the user of the vehicle 20 on a one-to-one basis.

When there is a plurality of users of the vehicle 20 or when one user of the vehicle 20 carries a plurality of smartphones 300, the smartphones 300 may correspond to the in-vehicle network system 200.

The in-vehicle network system 200, the center 10, and the smartphone 300 can perform communication through a predetermined communication network NW1 including a mobile communication network that is a wireless communication network with multiple base stations as terminals, an Internet network, or the like. In FIG. 1, for convenience, although one in-vehicle network system 200 and one smartphone 300 are shown, the in-vehicle network systems 200 of a plurality of vehicles 20, the smartphones 300 of the users of the vehicles 20, and the center 10 can perform communication through the communication network NW1.

The vehicle 20 is, for example, a hybrid vehicle (HV), a plug-in hybrid vehicle (PHV), an electric vehicle (EV), a gasoline vehicle, a diesel vehicle, or the like, and is mounted with the in-vehicle network system 200.

The in-vehicle network system 200 is a device that has an information processing function and a communication function. The in-vehicle network system 200 transmits vehicle information (data representing an accelerator operation amount, a brake operation, a vehicle speed, and a longitudinal acceleration, data representing the time of a start and the time of an end of a trip, and data representing a traveling distance of a trip) of the vehicle 20 to the center 10.

Data representing the brake operation is data representing that the brake operation (an operation to step on a brake pedal to apply a brake) is performed, and is used to observe an operation frequency of the brake. Since each piece of vehicle information is associated with time data, with observation of data representing the longitudinal acceleration when the brake operation is performed, the strength of the brake is understood.

The trip is the movement of the vehicle 20 from when an accessory mode of the vehicle 20 is on until the accessory mode is off. A traveling distance of the trip is the difference in value of an odometer between a start (start point) of the trip and an end (end point) of the trip.

The vehicle information (data representing the accelerator operation amount, the brake operation, the vehicle speed, and the longitudinal acceleration, data representing the start and the end of the trip, and data representing the traveling distance of the trip) is stored in a data area or the like in a frame format of data to be communicated between a data communication module (DCM) 203 and the center 10. Data representing the time (start point) of the start and the time (end point) of the end of the trip may be incorporated as a flag in a header or the like other than the data area.

The center 10 is a set of one or more computers (information processing devices). The center 10 receives the vehicle information from the in-vehicle network system 200 of the vehicle 20. The center 10 has the driving evaluation device 100. Here, a form in which the driving evaluation device 100 is a part of the functions of the center 10 will be described. The center 10 has, for example, functions of providing traffic information or route guidance or providing services with various applications to the in-vehicle network system 200 of the vehicle 20, in addition to the function as the driving evaluation device 100.

The driving evaluation device 100 evaluates an economical level based on the vehicle information that the center 10 receives from the in-vehicle network system 200 and transmits data representing an evaluation result to the smartphone 300 carried with the user of the vehicle 20. The evaluation result is displayed on a display panel of the smartphone 300. Here, although a form in which the driving evaluation device 100 is a part of the functions of the center 10 has been described, an applicable embodiment of the present disclosure is not limited to such a form, and for example, the driving evaluation device 100 may be provided as a dedicated center that performs driving evaluation.

Figure 2:
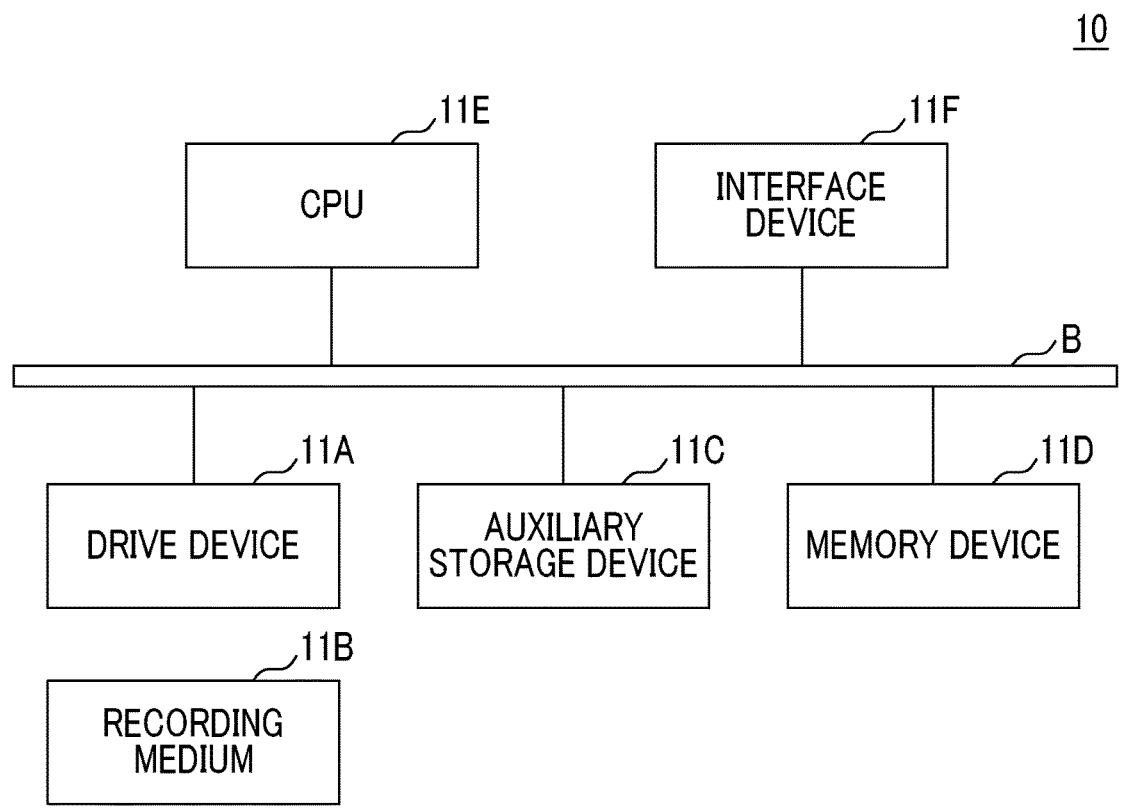
FIG. 2 is a diagram showing a hardware configuration example of a center in the embodiment.

FIG. 2 is a diagram showing a hardware configuration example of the center 10 in the embodiment. The center 10 of FIG. 2 has a drive device 11A, an auxiliary storage device 11C, a memory device 11D, a CPU 11E, an interface device 11F, and the like that are connected to one another through a bus B.

A program that implements processing in the center 10 is provided by a recording medium 11B, such as a compact disk-read only memory (CD-ROM). When the recording medium 11B storing the program is set in the drive device 11A, the program is installed from the recording medium 11B on the auxiliary storage device 11C through the drive device 11A. Note that the installation of the program is not indispensably performed from the recording medium 11B, and the program may be downloaded from another computer through the network. The auxiliary storage device 11C stores the installed program, and stores needed files, data, and the like.

The memory device 11D reads and stores the program from the auxiliary storage device 11C when there is a start instruction of the program. The CPU 11E executes functions related to the center 10 according to the program stored in the memory device 11D. The interface device 11F is used as an interface for connection to the network.

The recording medium 11B, the auxiliary storage device 11C, and the memory device 11D can be the recording medium storing the driving evaluation program. The recording medium 11B, the auxiliary storage device 11C, and the memory device 11D are non-transitory recording mediums.

Figure 3:
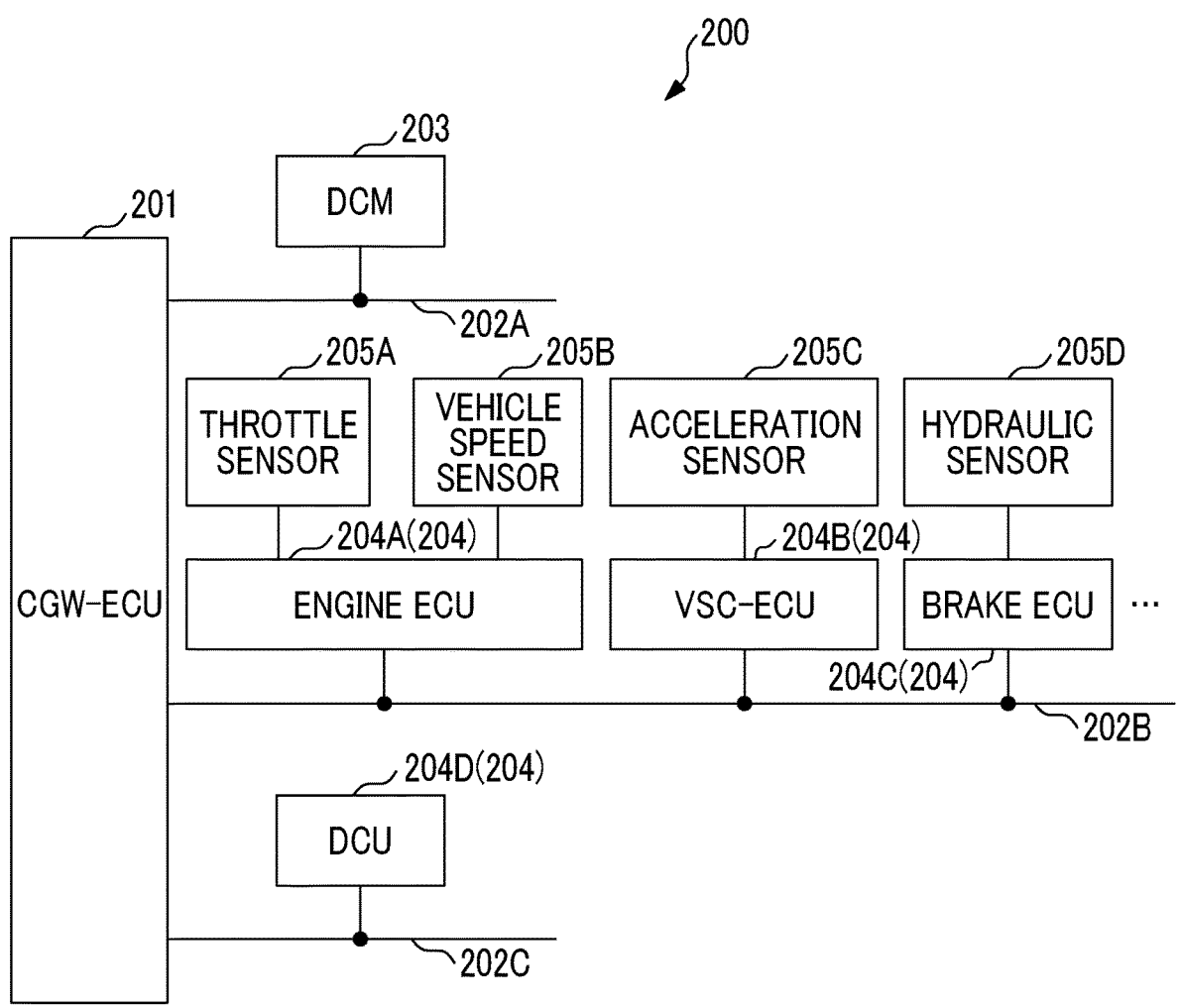
FIG. 3 is a diagram showing an in-vehicle network system.

FIG. 3 is a diagram showing the in-vehicle network system 200. The in-vehicle network system 200 includes a central gateway-electronic control unit (CGW-ECU) 201, buses 202A, 202B, 202C, the DCM 203, and a plurality of ECUs 204.

In FIG. 3, as the ECUs 204, an engine ECU 204A, a vehicle stability control (VSC)-ECU 204B, a brake ECU 204C, and a display control unit (DCU) 204D among various ECUs that are mounted in the vehicle 20 are shown. The DCU 204D is an ECU that controls display of one or a plurality of display panels disposed inside a vehicle cabin of the vehicle 20.

Although ECUs other than the engine ECU 204A, the VSC-ECU 204B, the brake ECU 204C, and the DCU 204D are included in the in-vehicle network system 200, these ECUs are omitted. When there is no need for particular distinction among the engine ECU 204A, the VSC-ECU 204B, the brake ECU 204C, and the DCU 204D, the engine ECU 204A, the VSC-ECU 204B, the brake ECU 204C, and the DCU 204D are simply referred to as an ECU 204.

A throttle sensor 205A and a vehicle speed sensor 205B are connected to the engine ECU 204A, an acceleration sensor 205C is connected to the VSC-ECU 204B, and a hydraulic sensor 205D is connected to the brake ECU 204C. Although various sensors other than the throttle sensor 205A, the vehicle speed sensor 205B, the acceleration sensor 205C, and the hydraulic sensor 205D are mounted in the vehicle 20, and each sensor is connected to any one ECU 204 or is connected directly to the bus (any one of 202A, 202B, 202C), these sensors are omitted.

Although an applicable embodiment of the present disclosure is not limited to a form in which, as shown in FIG. 3, the throttle sensor 205A and the vehicle speed sensor 205B are connected to the engine ECU 204A, the acceleration sensor 205C is connected to the VSC-ECU 204B, and the hydraulic sensor 205D is connected to the brake ECU 204C, here, a form having the connection relationship shown in FIG. 3 will be described.

Each of the CGW-ECU 201 and the ECUs 204 is implemented as a computer including a central processing unit (CPU), a random access memory (RAM), a read only memory (ROM), a clock generation unit, an input/output interface, a communication interface, a transmission and reception unit, an internal bus, and the like, as an example.

The in-vehicle network system 200 is mounted in the vehicle 20 and performs communication among the ECUs 204. The in-vehicle network system 200 acquires the vehicle information to be transmitted through the buses 202A, 202B, 202C at a predetermined sampling rate and transmits the vehicle information to the center 10 through the DCM 203 at each predetermined time (for example, eight minutes). The predetermined sampling rate is 100 milliseconds (ms), as an example.

The CGW-ECU 201 relays the vehicle information among the buses 202A, 202B, 202C.

The buses 202A, 202B, 202C are buses through which data communication using the protocol of Ethernet (Registered Trademark) is performed. The buses 202A, 202B, 202C may be buses through which data communication using a controller area network (CAN) protocol is performed.

The DCM 203 is connected to the bus 202A. The engine ECU 204A, the VSC-ECU 204B, and the brake ECU 204C are connected to the bus 202B. The DCU 204D is connected to the bus 202C. Although ECUs, sensors, and the like other than the DCM 203, the engine ECU 204A, the VSC-ECU 204B, the brake ECU 204C, and the DCU 204D may be connected to the buses 202A, 202B, 202C, here, these ECUs, sensors, and the like are omitted.

The DCM 203 is an example of an in-vehicle wireless communication device, and performs communication through, for example, a communication line, such as Third Generation (3G), Fourth Generation (4G), Long Term Evolution (LTE), or Fifth Generation (5G). The DCM 203 includes a communication terminal and a dedicated ECU. For this reason, the DCM 203 can be handled as a kind of ECU.

An identification (ID) is allocated to each ECU 204, and an ECU that is a transmission destination among the ECUs 204 is decided by the ID included in data to be transmitted.

The engine ECU 204A controls an output of an engine based on an accelerator operation amount, a vehicle speed, and the like detected by the throttle sensor 205A and the vehicle speed sensor 205B. In a case of the HV and the EV, an HV-ECU that controls an output of the engine or a drive motor and an EV-ECU that controls an output of the drive motor may be used instead of the engine ECU 204A. The accelerator operation amount may be detected by an accelerator position sensor.

The VSC-ECU 204B performs control for stabilizing a behavior of the vehicle 20 based on the longitudinal acceleration and a lateral acceleration of the vehicle 20 to be detected by the acceleration sensor 205C, and a yaw rate to be detected by a yaw rate sensor (not shown).

The brake ECU 204C executes control for implementing the function of an anti-lock brake system (ABS) and the function of the VSC based on hydraulic pressure or the like to be detected by the hydraulic sensor 205D provided in a master cylinder. The hydraulic pressure to be detected by the hydraulic sensor 205D represents a brake operation amount.

Data representing the accelerator operation amount, the vehicle speed, the acceleration, and the hydraulic pressure to be detected by the throttle sensor 205A, the vehicle speed sensor 205B, the acceleration sensor 205C, and the hydraulic sensor 205D is used in the engine ECU 204A, the VSC-ECU 204B, and the brake ECU 204C, and is transmitted to various ECUs through the buses 202A, 202B, 202C.

A forward acceleration in the longitudinal acceleration of the vehicle 20 to be detected by the acceleration sensor 205C among the accelerator operation amount, the vehicle speed, the acceleration, and the hydraulic pressure represents an acceleration resulting from the brake operation or an acceleration of deceleration resulting from accelerator-off. The forward acceleration when the brake operation is performed is used as data representing the acceleration of deceleration resulting from the brake operation. A state in which the brake operation is performed can be detected based on the hydraulic pressure to be detected by the hydraulic sensor 205D.

A rearward acceleration in the longitudinal acceleration of the vehicle 20 to be detected by the acceleration sensor 205C is used as data representing an acceleration resulting from an accelerator operation. The acceleration resulting from the accelerator operation is, in other words, strength of acceleration (propulsion force of the vehicle 20 in a traveling direction). When the vehicle 20 travels on a download slope, and when the vehicle speed increases with no accelerator operation, a rearward acceleration is generated; however, such a rearward acceleration can be distinguished from a state in which the accelerator operation amount is zero.

Data representing the hydraulic pressure to be detected by the hydraulic sensor 205D is used as data representing that the brake operation is performed. The frequency of brake operation can be detected by counting the frequency with which the hydraulic pressure becomes equal to or greater than a predetermined threshold to be a boundary value of the presence or absence of the brake operation.

The DCM 203 transmits data representing the accelerator operation amount, the brake operation, the vehicle speed, and the longitudinal acceleration in the vehicle information among data to be transmitted through the bus 202A to the center 10 at each predetermined time (for example, eight minutes). In data to be transmitted from the DCM 203 to the center 10, data representing the start of the trip is included at the time of the start of the trip, and data representing the end of the trip and data representing the traveling distance of the trip are included at the time of the end of the trip.

Figure 4:
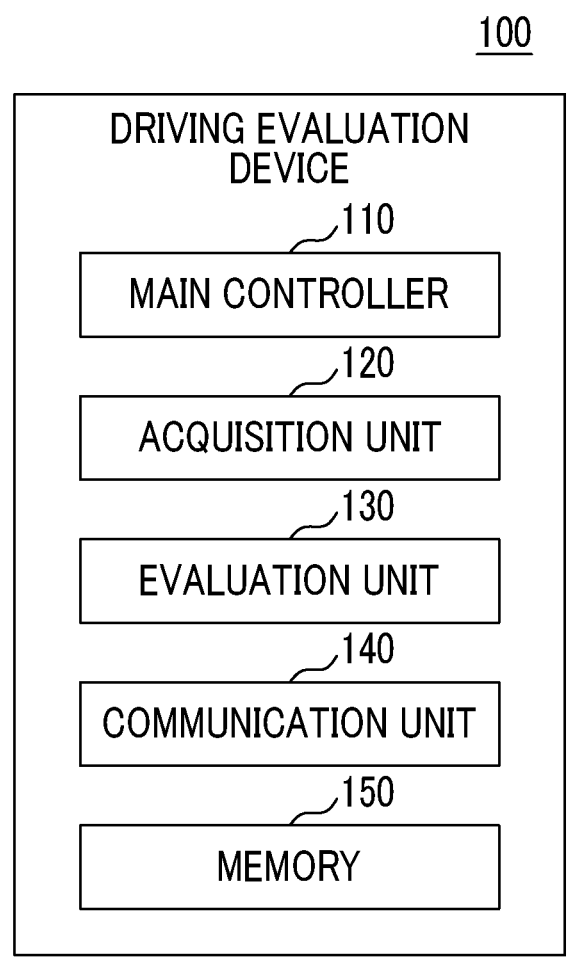
FIG. 4 is a diagram showing the configuration of the driving evaluation device.

FIG. 4 is a diagram showing the configuration of the driving evaluation device 100. The driving evaluation device 100 includes a main controller 110, an acquisition unit 120, an evaluation unit 130, a communication unit 140, and a memory 150. The main controller 110, the acquisition unit 120, the evaluation unit 130, and the communication unit 140 are functional blocks representing the functions of the program to be executed by the driving evaluation device 100. The memory 150 functionally represents a memory of the driving evaluation device 100.

The main controller 110 is a controller that integrates processing of the driving evaluation device 100. The main controller 110 executes processing other than processing to be executed by the acquisition unit 120, the evaluation unit 130, and the communication unit 140.

The acquisition unit 120 acquires the vehicle information (data representing the accelerator operation amount, the brake operation, the vehicle speed, and the longitudinal acceleration) of the vehicle 20 from the in-vehicle network system 200 of the vehicle 20 through the communication unit 140 at each predetermined time (for example, eight minutes). The vehicle information is acquired at a predetermined sampling rate (for example, 100 ms).

The acquisition unit 120 acquires data representing the start of the trip when the vehicle 20 starts the trip, and acquires data representing the end of the trip and data representing the traveling distance of the trip at the time of the end of the trip.

The evaluation unit 130 evaluates an economical level of each trip of the vehicle 20 based on data representing the accelerator operation amount, the brake operation, the vehicle speed, the longitudinal acceleration, and the traveling distance of the trip in the vehicle information. The economical level refers to a level of saving (economy) of fuel consumption accompanied by the operation of the vehicle 20. A high economical level represents the amount of saving of fuel consumption is large and represents that driving for saving fuel consumption is performed.

In evaluating the economical level, the evaluation unit 130 derives evaluation points for four evaluation items based on data representing the accelerator operation amount, the brake operation, the vehicle speed, the longitudinal acceleration, and the traveling distance of the trip.

The four evaluation items are calmness of an accelerator operation, calmness of a brake operation, smallness of change in vehicle speed, and shortness of an idling time, as an example. Details of the four evaluation items will be described below referring to FIGS. 5 to 8.

In evaluating the economical level, the evaluation unit 130 changes an evaluation method between when the maximum speed in each trip is equal to or higher than a predetermined speed and when the maximum speed is lower than the predetermined speed. The predetermined speed is 70 kilometers per hour (70 km/h), as an example.

The evaluation unit 130 performs evaluation every week (weekly), as an example. In this case, the evaluation unit 130 divides all trips of the vehicle 20 for one week into a high-speed group including a trip where the maximum speed is equal to or higher than 70 km/h and a low-speed group including a trip where the maximum speed is lower than 70 km/h, and obtains a total traveling distance of the low-speed group, a total traveling distance of the high-speed group, and a total traveling distance of the low-speed group and the high-speed group.

Then, the evaluation unit 130 calculates the evaluation points (five-stage evaluation) of the four evaluation items in each of the low-speed group and the high-speed group, and obtains a total value (score) of values obtained by multiplying the evaluation points by coefficients (degree of contribution or weight) of the evaluation items. The evaluation method including the coefficients and the like to be used at this time is different between the high-speed group including the trip where the maximum speed is equal to or higher than 70 km/h and the low-speed group including the trip where the maximum speed is lower than 70 km/h.

The evaluation unit 130 adds the evaluation points of the four evaluation items in the low-speed group and the evaluation points of the four evaluation items in the high-speed group through addition processing based on the ratio (distance ratio) of the total traveling distance of the each group to the traveling distance of all trips for one week, thereby obtaining an overall evaluation point (total evaluation point) of both of the low-speed group and the high-speed group for the four evaluation items.

The evaluation unit 130 adds the score of the low-speed group and the score of the high-speed group through addition processing according to the distance ratio, thereby obtaining an overall score (total score) of both of the low-speed group and the high-speed group.

The reason that the evaluation method is changed between when the maximum speed is equal to or higher than the predetermined speed and when the maximum speed is lower than the predetermined speed is because the influence of the four evaluation items is different between a trip where the vehicle speed is comparatively high and a trip where the vehicle speed is comparatively low. As an example, the calmness of the accelerator operation is effective for improving the economical level in a low-speed trip more than in a high-speed trip. The reason is as follows: in a high-speed trip where the vehicle speed is high to some extent, even though the accelerator is somewhat deeply stepped, this tends to hardly greatly affect an increase in the amount of fuel consumption (in other words, degradation of fuel efficiency); however, in a low-speed trip where the vehicle speed is low to some extent, when the accelerator is deeply stepped, this tends to easily greatly affect degradation of fuel efficiency. For this reason, the driving evaluation device 100 changes the evaluation method between when the maximum speed is equal to or higher than the predetermined speed and when the maximum speed is lower than the predetermined speed.

The reason that 70 km/h is set to the boundary value is because 70 km/h is a speed most suitable as a boundary for changing the evaluation method by an experiment. In Japan, a speed limit on an expressway (national highway and exclusive road for vehicle) is 100 km/h or 80 km/h for a standard vehicle or the like, and a speed limit on a general road other than the expressway is a maximum of 60 km/h. For this reason, 70 km/h that is a value between the speed limit on the expressway and the speed limit on the general road is set to the boundary value.

The communication unit 140 is a modem or the like that performs data communication with the DCM 203 of the in-vehicle network system 200. The communication unit 140 receives the vehicle information from the in-vehicle network systems 200 of the vehicles 20 and delivers data to the acquisition unit 120.

The memory 150 stores data, such as coefficients needed when the evaluation unit 130 evaluates the economical level, a program that implements the evaluation method, and the like, and temporarily stores data that is generated when the evaluation unit 130 performs evaluation processing.

Next, the evaluation of the economical level using the four evaluation items will be described. FIG. 5 is a table showing details of the four evaluation items for the low-speed group including the trip where the maximum speed is lower than 70 km/h, and FIG. 6 is a table showing details of the four evaluation items for the high-speed group including the trip where the maximum speed is equal to or higher than 70 km/h. FIG. 7 is a graph illustrating starting acceleration. The evaluation of the economical level is performed by the evaluation unit 130.

Here, as an example, a weekly evaluation method will be described. Each of all trips for one week is referred to as each trip.

As an example, a form in which a five-stage evaluation point is given for each evaluation item will be described. A white mark (☆) indicates that the evaluation point is the five stages of 1 to 5, and the evaluation point represents the number of black marks (★). When the evaluation point is three points, the number of black marks (★) is three.

The calmness of the accelerator operation represents that the accelerator operation amount is comparatively small. Even though the accelerator operation amount increases suddenly, when the accelerator operation amount itself is comparatively small, it can be said that the accelerator operation is calm. For this reason, the calmness of the accelerator operation can be regarded as the smallness of the accelerator operation amount.

The calmness of the accelerator operation is further divided into two minor evaluation items in both of the low-speed group and the high-speed group.

In the first minor evaluation item, a five-stage evaluation point is given according to an average value of a needed time of starting acceleration from 0 km/h to 40 km/h included in all trips of the low-speed group. The evaluation point is given for all trips of the high-speed group similarly.

The starting acceleration indicates that the vehicle continues to be accelerating, and does not include a case where acceleration is stopped halfway. Here, the beginning of a period during which the starting acceleration is performed is when the vehicle speed starts to increase from 0 km/h.

The end of the period during which the starting acceleration is performed refers to, as an example, 10 seconds before a difference obtained by subtracting a vehicle speed before 10 seconds from the vehicle speed at this time after the vehicle speed starts to increase from 0 km/h becomes a negative value. Specifically, description will be provided referring to FIG. 7. In FIG. 7, the horizontal axis represents the time, and the vertical axis represents the vehicle speed.

As shown in FIG. 7, it is assumed that the vehicle speed starts to increase from 0 km/h at time t0, and repeatedly increases and decreases. It is assumed that, as a result of repeatedly calculating a difference obtained by subtracting the vehicle speed before 10 seconds from the vehicle speed at this time using data of the vehicle speed obtained after time t0, it is assumed that the time at which the difference obtained by subtracting the vehicle speed before 10 seconds becomes negative is time t2. In this case, time t1 that is 10 seconds before time t2 becomes the end of the period during which the starting acceleration is performed. That is, the starting acceleration is performed from time t0 to time t1.

Similarly, it is assumed that, when the vehicle speed becomes 0 km/h at time t3, and the vehicle speed starts to increase, as a result of repeatedly calculating a difference by subtracting the vehicle speed before 10 seconds from the vehicle speed at this time using data of the vehicle speed obtained after time t3, the time at which the difference obtained by subtracting the vehicle speed before 10 seconds becomes negative is time t5. In this case, time t4 that is 10 seconds before time t5 becomes the end of the period during which the starting acceleration is performed. That is, the starting acceleration is performed from time t3 to time t4.

In this way, the evaluation unit 130 can detect the period during which the starting acceleration of the vehicle 20 is performed. Then, a needed time of the starting acceleration from 0 km/h to 40 km/h in the period during which the starting acceleration of the vehicle 20 is performed is obtained.

The starting acceleration from 0 km/h to 40 km/h is starting acceleration from a stopped state, the vehicle speed increases from a state in which the vehicle speed to be detected by the vehicle speed sensor 205B is 0 km/h with an increase in accelerator operation amount to be detected by the throttle sensor 205A, and when the vehicle speed reaches 40 km/h, the evaluation unit 130 can detect that the starting acceleration from 0 km/h to 40 km/h is performed.

Specifically, for the low-speed group and the high-speed group, as shown in FIGS. 5 and 6, point distribution is made such that, when the needed time is 19 seconds or more, the evaluation point is five (five ★ ), when the needed time is 18 seconds to 18.9 seconds, the evaluation point is four (four ★ ), when the needed time is 17 seconds to 17.9 seconds, the evaluation point is three (three ★ ), when the needed time is 16 seconds to 16.9 seconds, the evaluation point is two (two ★ ), and when the needed time is less than 16 seconds, the evaluation point is one (one ★ ). The needed time is represented to the first decimal place.

A state in which the needed time of the starting acceleration from 0 km/h to 40 km/h is short represents that acceleration is comparatively rapid, and a state in which the needed time is short represents that acceleration is comparatively smooth. For this reason, point distribution is made such that the evaluation point becomes higher when the needed time becomes longer. The reason that the evaluation point increases every second of 16 seconds to 19 seconds is because it is understood that the difference becomes large in this time period through an experiment or the like.

Data when deceleration occurs before the vehicle speed reaches 40 km/h after starting from the state of 0 km/h is not included in data for calculating an average value of the needed time and is excluded therefrom.

The two minor evaluation items of the calmness of the accelerator operation are to evaluate the accelerator operation amount during traveling, and are different in the evaluation method between the low-speed group and the high-speed group.

For the low-speed group, a proportion of the number of pieces of data of the accelerator operation amount of 0% to 30% to the number of pieces of data of all accelerator operation amounts during traveling in a speed range from 30 km/h to 70 km/h in each trip is obtained, and an average value of the proportion for all trips of the low-speed group is obtained. Then, a five-stage evaluation point is given according to the average value of the proportion.

All accelerator operation amounts during traveling in the speed range from 30 km/h to 70 km/h are accelerator operation amounts to be detected by the throttle sensor 205A when the vehicle speed to be detected by the vehicle speed sensor 205B is within a range of 30 km/h to 70 km/h.

Specifically, point distribution is made such that, when the average value of the proportion is 98% or more, the evaluation point is five (five ★ ), when the average value of the proportion is 97.9% to 96%, the evaluation point is four (four ★ ), when the average value of the proportion is 95.9% to 93%, the evaluation point is three (three ★ ), when the average value of the proportion is 87.1% to 92.9%, the evaluation point is two (two ★ ), and when the average value of the proportion is 87% or less, the evaluation point is one (one ★ ).

For the high-speed group, a proportion of the number of pieces of data of the accelerator operation amount of 0% to 40% to the number of pieces of data of all accelerator operation amounts during traveling in a speed range of equal to or higher than 30 km/h in each trip is obtained, and an average value of the proportion for all trips of the high-speed group is obtained. Then, a five-stage evaluation point is given according to the average value of the proportion.

All accelerator operation amounts during traveling in the speed range of equal to or higher than 30 km/h are accelerator operation amounts to be detected by the throttle sensor 205A when the vehicle speed to be detected by the vehicle speed sensor 205B is equal to or higher than 30 km/h.

Specifically, point distribution is made such that, when the average value of the proportion is 99% or more, the evaluation point is five (five ★ ), when the average value of the proportion is 98.9% to 98%, the evaluation point is four (four ★ ), when the average value of the proportion is 97.9% to 96.5%, the evaluation point is three (three ★ ), when the average value of the proportion is 96.4% to 93.1%, the evaluation point is two (two ★ ), and when the average value of the proportion is 93% or less, the evaluation point is one (one ★ ).

In the high-speed group, the proportion of data of the accelerator operation amount of 0% to 40% to data of all accelerator operation amounts is obtained to evaluate the economical level, and an upper limit value of the accelerator operation amount is set to be higher than in the low-speed group for which the proportion of data of the accelerator operation amount of 0% to 30% is obtained.

In other words, the upper limit value of the accelerator operation amount in the low-speed group is set to be lower than the upper limit value of the accelerator operation amount in the high-speed group. This is because the high-speed group is a high speed range, and the accelerator operation amount less affects fuel efficiency. For this reason, for the low-speed group, an economical level with a smaller accelerator operation amount is evaluated to be higher with a smaller accelerator operation amount as an upper limit value.

For the average value of the proportion for which the five-stage evaluation point is given, a tendency that the average value of the proportion in the high-speed group is set to be higher than the average value of the proportion in the low-speed group as a whole is obtained through an experiment or the like, and the high-speed group is subjected to five-stage evaluation under a stricter condition.

The calmness of the brake operation is given with an evaluation point based on the frequency of brake operation during traveling per 10 km and the magnitude of the forward acceleration of the vehicle 20 resulting from the brake operation. A method of giving the evaluation point for the calmness of the brake operation is the same between the low-speed group and the high-speed group.

An average frequency of brake operation during traveling per 10 km is obtained as follows. The forward acceleration of the vehicle 20 resulting from the brake operation in all trips included in each group is divided into three stages of 0.2 G to less than 0.25 G, 0.25 G to less than 0.3 G, and 0.3 G or more.

The forward acceleration of the vehicle 20 resulting from the brake operation can be distinguished from a state in which the hydraulic pressure to be detected by the hydraulic sensor 205D is equal to or greater than a predetermined threshold when the forward acceleration of the vehicle 20 is detected by the acceleration sensor 205C.

In the frequency of brake operation in each trip, a frequency with which the forward acceleration falls within each of the three ranges of 0.2 G to less than 0.25 G, 0.25 G to less than 0.3 G, and 0.3 G or more is counted for each range.

The counted frequency is converted to the frequency of brake operation during traveling per 10 km. In addition, a five-stage evaluation point is given according to an average value of the frequency of brake operation (a conversion value per 10 km) in all trips for each group. For a trip lower than 10 km, the counted frequency may be converted to the frequency per 10 km or may be excluded.

Details of the method of giving the evaluation point for the calmness of the brake operation will be described after description of FIGS. 5 and 6.

The smallness of the change in vehicle speed represents that the vehicle is traveling while maintaining a constant vehicle speed to some extent, and specifically, represents a traveling state in which the vehicle speed is equal to or higher than 20 km/h and an absolute value of the longitudinal acceleration is equal to or less than 0.1 G Such a traveling state is handled as constant-speed traveling since the speed is substantially constant though not completely constant.

For the low-speed group, a proportion of the number of pieces of data in a traveling state in which the vehicle speed is equal to or higher than 20 km/h and the absolute value of the longitudinal acceleration is equal to or less than 0.1 G to the number of pieces of data of all vehicle speeds of each trip is obtained, and an average value of the proportion for all trips of the low-speed group is obtained. Then, a five-stage evaluation point is given according to the average value of the proportion. The average value of the proportion is a value obtained by rounding off to the ones place, as an example.

Specifically, point distribution is made such that, when the average value of the proportion is 90% or more, the evaluation point is five (five ★), when the average value of the proportion is 85% to 89%, the evaluation point is four (four ★), when the average value of the proportion is 80% to 84%, the evaluation point is three (three ★), when the average value of the proportion is 75% to 79%, the evaluation point is two (two ★), and when the average value of the proportion is 74% or less, the evaluation point is one (one ★).

For the high-speed group, the average value of the proportion is obtained by the same method as in the low-speed group, and a five-stage evaluation point is given according to the average value of the proportion.

Then, when the average value of the proportion is 95% or more, the evaluation point is five (five ★), when the average value of the proportion is 90% to 94%, the evaluation point is four (four ★), when the average value of the proportion is 80% to 89%, the evaluation point is three (three ★), when the average value of the proportion is 70% to 79%, the evaluation point is two (two ★), and when the average value of the proportion is 69% or less, the evaluation point is one (one ★).

The reason that the high-speed group is subjected to five-stage evaluation within a wider numerical range of the average value of the proportion from a lower value to a higher value than in the low-speed group is because it is understood that setting of such a numerical range is appropriate through an experiment or the like.

Here, although a form in which the proportion of the number of pieces of data in the traveling state in which the vehicle speed is equal to or higher than 20 km/h and the absolute value of the longitudinal acceleration is equal to or less than 0.1 G to the number of pieces of data of all vehicle speeds of each trip is obtained has been described, a proportion to the number of pieces of data of all longitudinal accelerations of each trip may be obtained. This is because the number of pieces of data of the vehicle speed is the same as the number of pieces of data of the longitudinal acceleration.

The shortness of the idling time contributes to the improvement of the economical level when the vehicle 20 continues to be driven while the engine is not stopped when the vehicle speed is 0 km/h.

The idling time is a period during which the vehicle speed becomes 0 km/h from the start to the end of the trip, and is obtained as a proportion of the number of pieces of data of the vehicle speed of 0 km/h to the number of pieces of data of the vehicle speed from the start to the end of each trip. Then, an average value of the proportion of the number of pieces of data of the vehicle speed of 0 km/h for all trips is obtained, and an evaluation point is given according to the average value of the proportion. The shortness of the idling time is the same between the low-speed group and the high-speed group. The average value of the proportion is obtained by rounding off to the ones place.

Point distribution is made such that, when the average value of the proportion is within 30%, the evaluation point is five (five ★), when the average value of the proportion is 31% to 35%, the evaluation point is four (four ★), when the average value of the proportion is 36% to 40%, the evaluation point is three (three ★), when the average value of the proportion is 41% to 45%, the evaluation point is two (two ★), and when the average value of the proportion is 46% or more, the evaluation point is one (one ★).

FIGS. 8A and 8B is a table showing data that is used to give an evaluation point for the calmness of the brake operation. A method of giving the evaluation point for the calmness of the brake operation is the same between the low-speed group including the trip where the maximum speed is lower than 70 km/h and the high-speed group including the trip where the maximum speed is equal to or higher than 70 km/h. Specifically, the evaluation point is given as described below. In FIGS. 8A and 8B, 0.25 G to less than 0.3 G is denoted as 0.25 G to 0.3 G, and 0.2 G, to less than 0.25 G is denoted as 0.2 G to 0.25 G.

The number of patterns of a brake operation where the evaluation point becomes five (five ★) is 12. The 12 patterns refer to a case where the frequency of brake operation of equal to or greater than 0.3 G is zero, the frequency of brake operation of equal to or greater than 0.25 G and less than 0.3 G is zero or one, and the frequency of brake operation of equal to or greater than 0.2 G and less than 0.25 G is one to six.

The number of patterns of a brake operation where the evaluation point becomes four (four ★) is six, and the six patterns refer to a case where the frequency of brake operation of equal to or greater than 0.3 G is zero, the frequency of brake operation of equal to or greater than 0.25 G and less than 0.3 G is equal to or less than two, and the frequency of brake operation of equal to or greater than 0.2 G and less than 0.25 G is seven or eight.

The number of patterns of a brake operation where the evaluation point becomes three (three ★) is eight. The eight patterns refer to a case where the frequency of brake operation of equal to or greater than 0.3 G is zero, the frequency of brake operation of equal to or greater than 0.25 G and less than 0.3 G is equal to or less than three, and the frequency of brake operation of equal to or greater than 0.2 G and less than 0.25 G is nine, and a case where the frequency of brake operation of equal to or greater than 0.3 G is one, the frequency of brake operation of equal to or greater than 0.25 G and less than 0.3 G is equal to or less than three, and the frequency of brake operation of equal to or greater than 0.2 G and less than 0.25 G is equal to or less than nine. Since the brake operation of 0.3 G is a sudden brake operation and greatly affects fuel efficiency, like the fifth to eighth patterns from the top among the eight patterns, even though the frequency of brake operation of equal to or greater than 0.2 G and less than 0.25 G is equal to or less than nine, when the frequency of brake operation of 0.3 G is one, the evaluation point is set to three.

The number of patterns of a brake operation where the evaluation point becomes two (two ★) is 14, and the 14 patterns refer to a case where the frequency of brake operation of equal to or greater than 0.3 G is zero, the frequency of brake operation of equal to or greater than 0.25 G and less than 0.3 G is equal to or less than four, and the frequency of brake operation of equal to or greater than 0.2 G and less than 0.25 G is 10, a case where the frequency of brake operation of equal to or greater than 0.3 G is one, the frequency of brake operation of equal to or greater than 0.25 G and less than 0.3 G is equal to or less than zero, and the frequency of brake operation of equal to or greater than 0.2 G and less than 0.25 G is equal to or less than 10, a case where the frequency of brake operation of equal to or greater than 0.3 G is one, the frequency of brake operation of equal to or greater than 0.25 G and less than 0.3 G is equal to or less than three, and the frequency of brake operation of equal to or greater than 0.2 G and less than 0.25 G is 10, and a case where the frequency of brake operation of equal to or greater than 0.3 G is two, the frequency of brake operation of equal to or greater than 0.25 G and less than 0.3 G is equal to or less than four, and the frequency of brake operation of equal to or greater than 0.2 G and less than 0.25 G is equal to or less than 10.

The number of patterns of a brake operation where the evaluation point becomes one (one ★) is eight, and the eight patterns refer to a case where the frequency of brake operation of equal to or greater than 0.3 G is equal to or less than three, the frequency of brake operation of equal to or greater than 0.25 G and less than 0.3 G is equal to or less than five, the frequency of brake operation of equal to or greater than 0.2 G and less than 0.25 G is equal to or greater than 11, a case where the frequency of brake operation of equal to or greater than 0.3 G is equal to or less than two, the frequency of brake operation of equal to or greater than 0.25 G and less than 0.3 G is equal to or greater than five, and there is no brake operation of equal to or greater than 0.2 G and less than 0.25 G, and a case where the frequency of brake operation of equal to or greater than 0.3 G is equal to or greater than three, and there is no brake operation of equal to or greater than 0.25 G and less than 0.3 G and no brake operation of equal to or greater than 0.2 G and less than 0.25 G.

All data needed for obtaining the evaluation point described above referring to FIGS. 5 to 8 are stored in the memory 150.

FIG. 9 is a table illustrating ways of obtaining scores of the low-speed group and the high-speed group and a way of obtaining a total evaluation result. The ways of obtaining the scores of the low-speed group and the high-speed group are shown on the left side and the right side of the upper half of FIG. 9, respectively, and the way of obtaining the total evaluation result is shown in the lower half of FIG. 9.

As shown on the left side in the upper half of FIG. 9, it is assumed that, for the calmness of the accelerator operation of the low-speed group, the evaluation points at starting and during traveling are two (two ★) and three (three ★), respectively. For the calmness of the accelerator operation of the low-speed group, the degrees of contribution at starting and during traveling are set to 50% to 50%.

When the evaluation points at starting and during traveling are added with the degree of contribution of 50% to 50% to calculate the evaluation point for the calmness of the accelerator operation of the low-speed group, the evaluation point becomes 2.5 points through 2 points×50%+3 points× 50%. Three (three ★) obtained by rounding off the value becomes the evaluation point for the calmness of the accelerator operation of the low-speed group.

It is assumed that the evaluation points for the calmness of the brake operation, the smallness of the change in vehicle speed, and the shortness of the idling time of the low-speed group are two (two ★), three (three ★), and two (two ★), respectively.

Coefficients of the calmness of the accelerator operation, the calmness of the brake operation, the smallness of the change in vehicle speed, and the shortness of the idling time in the low-speed group are set to 20%, 20%, 25%, and 35%, respectively. The coefficients are the contribution rates of the evaluation points for the items to the total evaluation point.

When such coefficients are used, the score of the low-speed group is obtained as (3 points×20%+2 points×20%+3 points×25%+2 points×35%)/5×100=49 points.

As shown on the right side in the upper half of FIG. 9, it is assumed that, for the calmness of the accelerator operation of the high-speed group, the evaluation points at starting and during traveling are four (four ★) and two (two ★), respectively. Here, it is assumed that, for the calmness of the accelerator operation of the high-speed group, the degree of contribution at starting and during traveling is set to 40% to 60%.

When the evaluation points at starting and during traveling are added with the degree of contribution of 40% to 60% to calculate the evaluation point for the calmness of the accelerator operation of the high-speed group, the evaluation point becomes 4 points×40%+2 points×60%=2.8 points. Three (three ★) obtained by rounding off the value becomes the evaluation point for the calmness of the accelerator operation of the high-speed group.

It is assumed that, for the calmness of the brake operation, the smallness of the change in vehicle speed, and the shortness of the idling time of the high-speed group, the evaluation points are four (four ★), three (three ★), and four (four ★), respectively.

Coefficients of the calmness of the accelerator operation, the calmness of the brake operation, the smallness of the change in vehicle speed, and the shortness of the idling time in the high-speed group are set to 20%, 15%, 45%, and 20%, respectively. The coefficients are contribution rates of the evaluation points for the items to the total evaluation point.

When such coefficients are used, the score of the high-speed group is obtained as (3 points×20%+4 points×15%+3 points×45%+4 points×20%)/5×100=67 points.

Next, the way of obtaining the total evaluation result shown in the lower half of FIG. 9 will be described. The evaluation points and the scores obtained as described above for the low-speed group and the high-speed group are subjected to addition processing using the ratio (distance ratio) of the total traveling distance of the trips of the low-speed group to the total traveling distance of the trips of the high-speed group. Here, it is assumed that the total traveling distance of the trips of the low-speed group is 30 km, and the total traveling distance of the trips of the high-speed group is 70 km. The distance ratio in this case is 30 to 70.

For this reason, the total evaluation point for the calmness of the accelerator operation becomes 3 points×30%+3 points×70%=3 points (three ★). The total evaluation point for the calmness of the brake operation is calculated to be 2 points×30%+4 points×70%=3.4, and becomes 3 points (three ★) by rounding off to the ones place.

The total evaluation point of the smallness of the change in vehicle speed becomes 3 points×30%+3 points×70%=3 points (three ★). The total evaluation point of the shortness of the idling time is calculated to be 2 points×30%+4 points×70%=3.4, and becomes 3 points (three ★) by rounding off to the ones place.

The total score is calculated to be 49 points×30%+67 points×70%=61.6, and becomes 62 points by rounding off to the ones place.

The coefficient of the calmness of the brake operation is 20% in the low-speed group and is 15% in the high-speed group. That is, the coefficient of the calmness of the brake operation is set to a greater value in the low-speed group than in the high-speed group.

Since a case where the frequency of brake operation is smaller and the forward acceleration resulting from the brake operation is smaller when the vehicle speed is low than when the vehicle speed is high greatly contributes to the improvement of the economical level, such a coefficient is allocated. For this reason, in evaluating the economical level based on the calmness of the brake operation, the economical level depending on the calmness of the brake operation in the low-speed group is evaluated to be higher than in the high-speed group.

The coefficient of the smallness of the change in vehicle speed is 25% in the low-speed group and is 45% in the high-speed group. That is, the coefficient of the smallness of the change in vehicle speed is set to be a greater value in the high-speed group than in the low-speed group.

The smallness of the change in vehicle speed is implemented by smallness of the brake operation or smallness of braking force, and smallness of the accelerator operation amount (calmness of acceleration). This is because, in such a case, the longitudinal acceleration of the vehicle 20 becomes small.

Since a case where the vehicle change in vehicle speed is small (the vehicle is traveling at a constant speed or the vehicle is traveling while maintaining the vehicle speed) more greatly contributes to the improvement of the economical level when the vehicle speed is high than when the vehicle speed is low, such a coefficient is allocated. This is because, when the vehicle speed is high to some extent, the vehicle speed within a given range more greatly contributes to high fuel efficiency driving than when the vehicle speed is low.

Accordingly, in evaluating the economical level based on the smallness of the change in vehicle speed, the economical level depending on the smallness of the change in vehicle speed in low-speed group is evaluated to be higher than in the high-speed group.

The coefficient of the shortness of the idling time is 35% in the low-speed group and is 20% in the high-speed group. That is, the coefficient of the shortness of the idling time is set to be a greater value in the low-speed group than in the high-speed group.

Since a case where the idling time is short more greatly contributes to the improvement of the economical level when the vehicle speed is low to some extent than when the vehicle speed is high to some extent, such a coefficient is allocated. For example, when the vehicle travels in an urban area, the idling time is short, fuel efficiency is remarkably improved, and in a situation in which the vehicle travels at a high vehicle speed to some extent again while passing through an idling state after traveling at a high vehicle speed to some extent, idling comparatively less affects fuel efficiency.

Accordingly, in evaluating the economical level based on the shortness of the idling time, the economical level depending on the shortness of the idling time in a constant speed group is evaluated to be higher than in the high-speed group.

Figure 10:
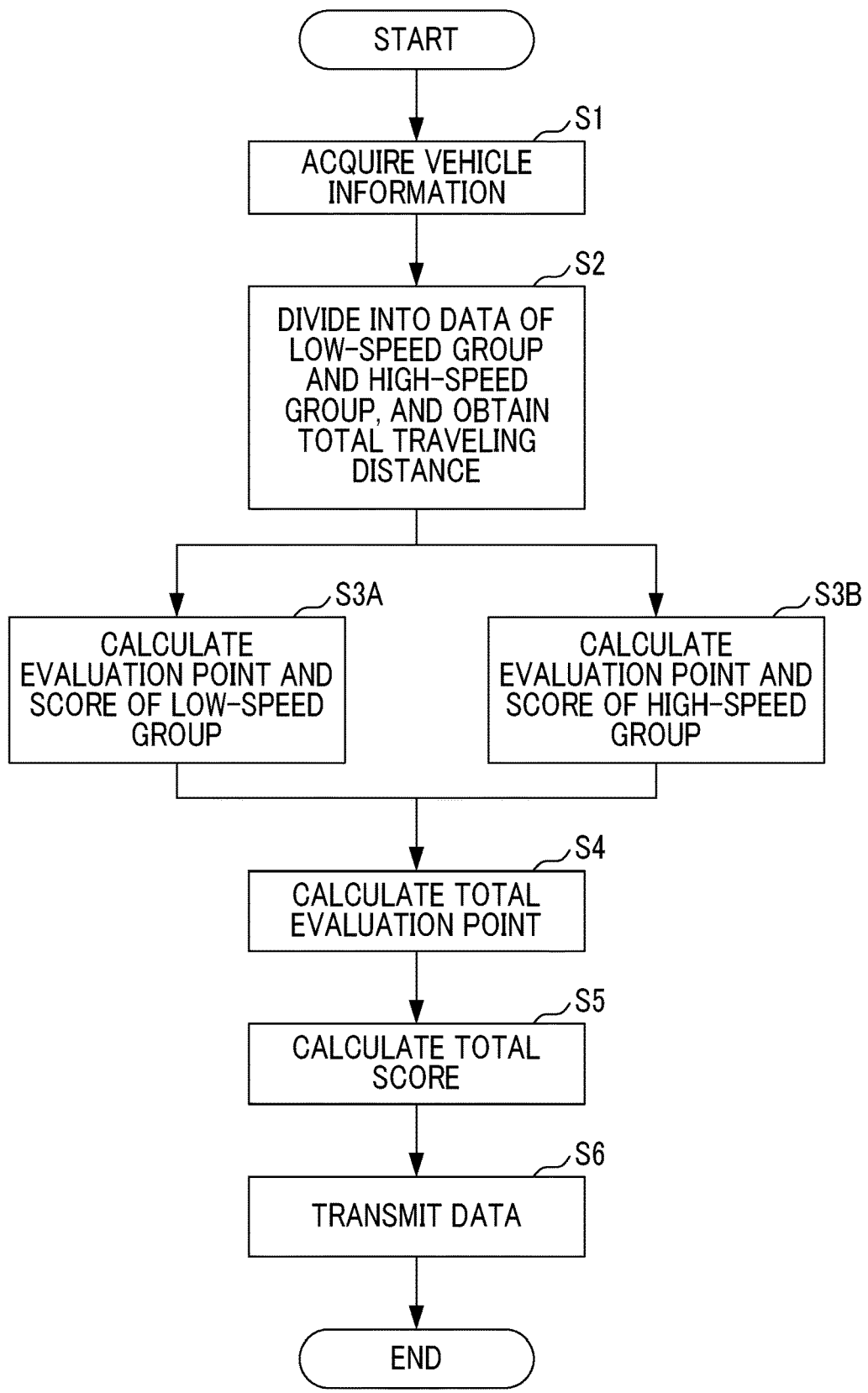
FIG. 10 is a flowchart showing processing that is executed when the driving evaluation device evaluates an economical level.

FIG. 10 is a flowchart showing processing that is executed when the driving evaluation device 100 evaluates the economical level.

When the processing starts, the acquisition unit 120 acquires the vehicle information (Step S1). The acquisition unit 120 acquires the vehicle information to be transmitted from the DCM 203 of the in-vehicle network system 200 to the communication unit 140 at each predetermined time (for example, eight minutes).

The acquisition unit 120 repeatedly executes the processing for acquiring the vehicle information in Step S1. Here, since evaluation is performed weekly, the vehicle information for one week is acquired through the processing of Step S1.

The evaluation unit 130 divides all trips of the vehicle 20 for one week into the high-speed group including the trip where the maximum speed is equal to or higher than 70 km/h and the low-speed group including the trip where the maximum speed is lower than 70 km/h based on data representing the traveling distance of the trips included in the vehicle information for one week, and obtains the total traveling distance of the low-speed group, the total traveling distance of the high-speed group, and the total traveling distance of the low-speed group and the high-speed group (Step S2).

In the processing of Step S2, the total traveling distance of the low-speed group, the total traveling distance of the high-speed group, and the total traveling distance of the low-speed group and the high-speed group are calculated to be 30 km, 70 km, and 100 km, respectively.

The evaluation unit 130 performs parallel processing using data of the low-speed group and data of the high-speed group, thereby calculating the evaluation points and the score of the low-speed group and the evaluation points and the score of the high-speed group (Steps S3A and S3B).

Through the processing of Step S3A, for example, as shown in FIG. 9, the evaluation points for the calmness of the accelerator operation, the calmness of the brake operation, the smallness of the change in vehicle speed, and the shortness of the idling time in the low-speed group are calculated to be three points (three ★), two points (two ★), three points (three ★), and two points (two ★), and the score is calculated to be 49 points.

Through the processing of Step S3B, for example, as shown in FIG. 9, the evaluation points for the calmness of the accelerator operation, the calmness of the brake operation, the smallness of the change in vehicle speed, and the shortness of the idling time in the high-speed group are calculated to be three points (three ★), four points (four ★), three points (three ★), and four points (four ★), and the score is calculated to be 67 points.

The evaluation unit 130 calculates the total evaluation point is calculated from the evaluation points for the calmness of the accelerator operation, the calmness of the brake operation, the smallness of the change in vehicle speed, and the shortness of the idling time in the low-speed group and the high-speed group calculated in Steps S3A and 3B using the distance ratio of the total traveling distance of the low-speed group to the total traveling distance of the high-speed group (Step S4).

Through the processing of Step S4, for example, as shown in FIG. 9, the total evaluation point for the calmness of the accelerator operation is calculated to be three points (three ★), the total evaluation point for the calmness of the brake operation is calculated to be three points (three ★), the total evaluation point for the smallness of the change in vehicle speed is calculated to be three points (three ★), and the total evaluation point for the shortness of the idling time is calculated to be three points (three ★).

The evaluation unit 130 calculates the total score from the scores calculated in Steps S3A and 3B using the distance ratio (Step S5).

Through the processing of Step S5, for example, as shown in FIG. 9, the total score is calculated to be 62 points.

The main controller 110 transmits data representing the total evaluation point and the total score calculated in Steps S4 and S5 to the smartphone 300 of the user of the vehicle 20 through the communication unit 140 (Step S6).

When the processing of Step S6 ends, the main controller 110 ends a series of processing (END). The driving evaluation device 100 repeatedly executes the processing of Steps S1 to S6.

Figure 11:
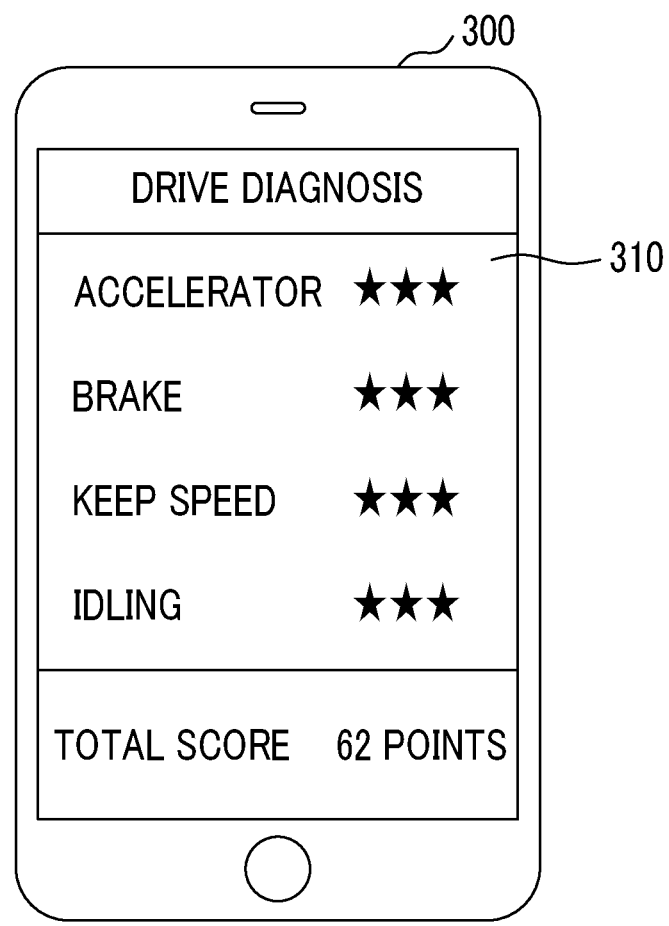
FIG. 11 is a diagram showing a display example of a display panel of a smartphone.

FIG. 11 is a diagram showing a display example of the display panel 310 of the smartphone 300. On the display panel 310 of the smartphone 300, as a result of drive diagnosis, the total evaluation result is displayed to be accelerator—three points (three ★), brake—three points (three ★), keep speed—three points (three ★), and idling—three points (three ★), and the total score is displayed to be 62 points.

The drive diagnosis is an expression of driving evaluation in plain terms, and the four items of accelerator, brake, keep speed, and idling are expressions of the calmness of the accelerator operation, the calmness of the brake operation, the smallness of the change in vehicle speed, and the shortness of the idling time as the four evaluation items in plain terms.

Such drive diagnosis is transmitted to the smartphone 300 of the user of the vehicle 20 weekly, and is displayed on the display panel 310. A period (in this case, one week) during which the drive diagnosis is performed may be set through access of the user to the driving evaluation device 100 of the center 10 using the smartphone 300.

As a result of the drive diagnosis, the evaluation points and the scores of the low-speed group and the high-speed group may also be displayed.

As described above, with the embodiment, the vehicle information is divided into the low-speed group and the high-speed group according to the maximum speed of each trip, and the evaluation method of the economical level is changed between the low-speed group and the high-speed group.

For example, in evaluating the economical level depending on the needed time of the starting acceleration from 0 km/h to 40 km/h, the upper limit value of the accelerator operation amount in the low-speed group is set to be lower than the upper limit value of the accelerator operation amount in the high-speed group.

In evaluating the economical level depending on the calmness of the brake operation, the coefficient of the low-speed group is set to be a value greater than the coefficient of the high-speed group.

In evaluating the economical level depending on the smallness of the change in vehicle speed, the coefficient of the high-speed group is set to be a value greater than the coefficient of the low-speed group.

In evaluating the economical level depending on the shortness of the idling time, the coefficient of the low-speed group is set to be a value greater than the coefficient of the high-speed group.

In this way, the evaluation method of the economical level is changed according to the maximum speed in the trip, whereby it is possible to perform evaluation with higher accuracy corresponding to the speed range of the trip.

Accordingly, it is possible to provide the driving evaluation device 100, the driving evaluation method, and the recording medium storing the driving evaluation program capable of performing evaluation with higher accuracy.

In the above description, a form in which, for the four values of the upper limit value of the accelerator operation amount in evaluating the economical level depending on the needed time of the starting acceleration, the coefficient in evaluating the economical level depending on the shortness of the idling time, the coefficient in evaluating the economical level depending on the smallness of the change in vehicle speed, and the coefficient in evaluating the economical level depending on the calmness of the brake operation, different values are used between the low-speed group and the high-speed group has been described.

However, since the shortness of the idling time tends to have the degree of contribution to the improvement of the economical level among the four items, the economical level may be evaluated with the three items excluding the shortness of the idling time. In this case, the coefficient allocated to the shortness of the idling time is distributed according to the ratio of the coefficients of the remaining three items. In particular, in a case where a vehicle in which a stop and start function of stopping an engine while the vehicle is stopped is mounted, or a vehicle, such as an HV or a PHV, in which an engine is stopped while the vehicle is stopped, or an EV, the economical level may be evaluated with the three items excluding the shortness of the idling time.

The economical level may be evaluated using the smallness of change in vehicle speed among the four values and any one or two of the remaining three evaluation items.

In the above description, a form in which the coefficient of the calmness of the accelerator operation is the same between the low-speed group and the high-speed group has been described. As shown in FIG. 9, the coefficient of the calmness of the accelerator operation is 20% in both of the low-speed group and the high-speed group. However, when the degree of contribution of the calmness of the accelerator operation becomes higher in the low-speed group than in the high-speed group, the coefficient of the calmness of the accelerator operation in the low-speed group may be set to be greater than the coefficient in the high-speed group.

In this case, the degree of contribution of the calmness of the accelerator operation to the economical level is set to be higher in the low-speed group than in the high-speed group.

In the above description, although a form in which a value is rounded off to the ones place or the tenths place has been described, rounding-down or rounding-up may be performed.

In the above description, although the needed time of the starting acceleration from 0 km/h to 40 km/h included in all trips of the low-speed group and the high-speed group has been evaluated in the first minor evaluation item of the calmness of the accelerator operation, an applicable embodiment of the present disclosure is not limited to the starting acceleration to 40 km/h. The value is an example, when there is the other appropriate value for evaluating the calmness of the accelerator operation, such a value may be set.

In the above description, in the two minor evaluation items of the calmness of the accelerator operation, for the low-speed group, the proportion of the number of pieces of data of the accelerator operation amount of 0% to 30% to the number of pieces of data of all accelerator operation amounts during traveling in the speed range of 30 km/h to 70 km/h in each trip has been obtained, and for the high-speed group, the proportion of the number of pieces of data of the accelerator operation amount of 0% to 40% to the number of pieces of data of all accelerator operation amounts during traveling in the speed range of equal to or higher than 30 km/h in each trip has been obtained.

However, for the low-speed group, the speed range is not limited to the speed range of 30 km/h to 70 km/h, and the accelerator operation amount is not limited to 0% to 30%. Similarly, for the high-speed group, the speed range is not limited to the speed range of equal to or higher than 30 km/h, and the accelerator operation amount is not limited to 0% to 40%. These values are examples, and when there are the other appropriate values for evaluating the calmness of the accelerator operation, such values may be set.

In the above description, for the calmness of the brake operation, the magnitude of the forward acceleration of the vehicle 20 resulting from the brake operation has been divided into the three ranges of 0.2 G to less than 0.25 G, 0.25 G to less than 0.3 G, and 0.3 G or more, and evaluation has been performed according to the distribution of the three ranges of the frequency of brake operation during traveling per 10 km.

However, these values are examples, and when there are the other appropriate values for evaluating the calmness of the brake operation, such values may be set.

In the above description, although a form in which the smallness of the change in vehicle speed represents the traveling state in which the vehicle speed is equal to or higher than 20 km/h and the absolute value of the longitudinal acceleration is equal to or less than 0.1 G has been described, the vehicle speed may be equal to or higher than 0 km/h, and a threshold of the absolute value of the longitudinal acceleration is not limited to 0.1 G and may be set to another value.

In the above description, although the economical level is evaluated weekly has been described, the economical level may be evaluated monthly, yearly, or in other units.

In the above description, a form in which the trips of the vehicle 20 are divided into the low-speed group and the high-speed group with 70 km/h as the boundary value has been described. However, such a boundary value is not limited to 70 km/h.

For example, in a country or an area where a speed limit on an expressway is 120 km/h and a speed limit on a general road other than the expressway is a maximum of 80 km/h, for example, the boundary value may be set to an appropriate value of 90 km/h and 100 km/h that is a value between the speed limit on the expressway and the speed limit on the general road.

In this way, the boundary value may be set to an appropriate between a speed limit on a road, such as an expressway, on which the vehicle can continuously travel while maintaining the vehicle speed to some extent and the speed limit on the general road other than the expressway. The appropriate value may be set according to an average speed, a traveling situation, or the like of the vehicles on the expressway or the general road in the country or area.

In the above description, although a form in which the driving evaluation device 100 transmits the generated total evaluation point and total score to the smartphone 300 and makes the smartphone 300 display the total evaluation point and the total score has been described, the total evaluation point and the total score may be transmitted to the in-vehicle network system 200 of the vehicle 20 and may be displayed on a display panel or the like of the vehicle 20.

In the above description, although a form in which the driving evaluation device 100 is disposed in the center 10 has been described, the driving evaluation device 100 may be included in the in-vehicle network system 200. In this case, the driving evaluation device 100 may acquire the vehicle information from the bus 202A, 202B, or 202C of the in-vehicle network system 200 and may evaluate the economical level. In this case, the DCU 204D may display the total evaluation point and the total score on the display panel of the vehicle 20, or may transmit the total evaluation point and the total score to the smartphone 300 of the user of the vehicle 20 and may make the smartphone 300 display the total evaluation point and the total score.

The driving evaluation device 100 may be included in the smartphone 300. In this case, the driving evaluation device 100 included in the smartphone 300 may acquire the vehicle information from the in-vehicle network system 200 and may evaluate the economical level. In this case, the smartphone 300 may display the total evaluation point and the total score, or the smartphone 300 may transmit the total evaluation point and the total score to the in-vehicle network system 200 and the DCU 204D may display the total evaluation point and the total score on the display panel of the vehicle 20.

Although the driving evaluation device, the driving evaluation method, and the recording medium storing the driving evaluation program according to the exemplary embodiment of the present disclosure have been described above, an applicable embodiment of the present disclosure is not limited to the embodiment that is specifically disclosed, and various modifications or alterations can be made without departing from the spirit and scope of the present disclosure.

What is claimed is:

1. A driving evaluation device comprising:
a processor configured to:
acquire vehicle information including a vehicle speed in each trip of a vehicle;
evaluate an economical level of each trip of the vehicle based on a smallness of change in vehicle speed during each trip, the economical level being evaluated by calculating a total evaluation value obtained by (i) calculating an evaluation value for a first trip where a maximum speed of the vehicle is equal to or greater than a predetermined speed, (ii) calculating an evaluation value for a second trip where the maximum speed of the vehicle is lower than the predetermined speed, (iii) weighting each evaluation value by multiplying the evaluation value of the first trip and the evaluation value of the second trip according to a ratio of a distance of the first trip to a distance of the second trip, and (iv) summing the weighted evaluation value of the first trip and the weighted evaluation value of the second trip; and
change an evaluation method of the economical level based on the smallness of the change in vehicle speed according to a maximum speed in each trip.

2. The driving evaluation device according to claim 1, wherein in evaluating the economical level based on the smallness of the change in vehicle speed, the processor is configured to evaluate the economical level according to the smallness of the change in vehicle speed to be higher when the maximum speed is equal to or greater than a predetermined speed as compared to when the maximum speed is lower than the predetermined speed.

3. The driving evaluation device according to claim 1, wherein in evaluating the economical level based on the smallness of the change in vehicle speed and an evaluation item other than the smallness of the change in vehicle speed, the processor is configured to set a degree of contribution of the smallness of the change in vehicle speed to the economical level to be higher when the maximum speed is equal to or higher than a predetermined speed as compared to when the maximum speed is lower than the predetermined speed.

4. The driving evaluation device according to claim 1, wherein the predetermined speed is 70 kilometers per hour.

5. The driving evaluation device according to claim 1, wherein:
the vehicle information includes a longitudinal acceleration of the vehicle; and
the processor is configured to determine the smallness of the change in vehicle speed based on the longitudinal acceleration of the vehicle.

6. A driving evaluation method using a driving evaluation device configured to evaluate an economical level of each trip of a vehicle, the driving evaluation device including a processor, the driving evaluation method comprising:
acquiring, by the processor, vehicle information including a vehicle speed in each trip of the vehicle;
evaluating, by the processor, the economical level of each trip of the vehicle based on a smallness of change in vehicle speed during each trip, the economical level being evaluated by calculating a total evaluation value obtained by (i) calculating an evaluation value for a first trip where a maximum speed of the vehicle is equal to or greater than a predetermined speed, (ii) calculating an evaluation value for a second trip where the maximum speed of the vehicle is lower than the predetermined speed, (iii) weighting each evaluation value by multiplying the evaluation value of the first trip and the evaluation value of the second trip according to a ratio of a distance of the first trip to a distance of the second trip, and (iv) summing the weighted evaluation value of the first trip and the weighted evaluation value of the second trip; and
changing, by the processor, an evaluation method of the economical level based on the smallness of the change in vehicle speed according to a maximum speed in each trip.

7. A non-transitory computer readable recording medium storing a program causing a processor to execute a driving evaluation method using a driving evaluation device configured to evaluate an economical level of each trip of a vehicle, the program causing the processor to execute a control process of the driving evaluation device, the control process comprising:
acquiring vehicle information including a vehicle speed in each trip of the vehicle;
evaluating the economical level of each trip of the vehicle based on a smallness of change in vehicle speed during each trip, the economical level being evaluated by calculating a total evaluation value obtained by (i) calculating an evaluation value for a first trip where a maximum speed of the vehicle is equal to or greater than a predetermined speed, (ii) calculating an evaluation value for a second trip where the maximum speed of the vehicle is lower than the predetermined speed, (iii) weighting each evaluation value by multiplying the evaluation value of the first trip and the evaluation value of the second trip according to a ratio of a distance of the first trip to a distance of the second trip, and (iv) summing the weighted evaluation value of the first trip and the weighted evaluation value of the second trip; and
changing an evaluation method of the economical level based on the smallness of the change in vehicle speed according to a maximum speed in each trip.

* * * * *